(12) United States Patent
Cramer et al.

(10) Patent No.: US 8,831,998 B1
(45) Date of Patent: Sep. 9, 2014

(54) BATCH PRICING OF DIGITAL MEDIA INDEPENDENT OF PRICING MODELS

(75) Inventors: Alison Cramer, Seattle, WA (US); Michael Catbagan, Seattle, WA (US); Jason Rudmann, Spokane Valley, CA (US); Travis Gigliotti, Renton, WA (US); Chris Esler, Lake Stevens, WA (US); Mary Pat Gotschall, Seattle, WA (US); Monica Risse, Seattle, WA (US); Jon-Eric Steinbomer, Mercer Island, WA (US); Shannon McFarlin, Seattle, WA (US); Jason Blackburn, Seattle, WA (US); Pablo Supkay, Seattle, WA (US)

(73) Assignee: Corbis Corporation, Seattle, WA (US)

( * ) Notice: Subject to any disclaimer, the term of this patent is extended or adjusted under 35 U.S.C. 154(b) by 858 days.

(21) Appl. No.: 12/412,299

(22) Filed: Mar. 26, 2009

(51) Int. Cl.
*G06Q 99/00* (2006.01)
*G06Q 20/12* (2012.01)

(52) U.S. Cl.
CPC ........ *G06Q 20/1235* (2013.01); *G06Q 2220/18* (2013.01)
USPC .......................................................... 705/59

(58) Field of Classification Search
USPC .......................................................... 705/59
See application file for complete search history.

(56) References Cited

U.S. PATENT DOCUMENTS

| 5,414,806 | A  | * | 5/1995 | Richards ........................ 715/810 |
| 7,503,012 | B2 | * | 3/2009 | Chen et al. .................... 715/769 |
| 2002/0052933 | A1 | * | 5/2002 | Leonhard et al. ............. 709/219 |
| 2005/0114228 | A1 | * | 5/2005 | Wadhwani ....................... 705/26 |
| 2005/0154994 | A1 | * | 7/2005 | Chen et al. .................... 715/770 |
| 2010/0179860 | A1 | * | 7/2010 | Noel et al. ....................... 705/10 |

FOREIGN PATENT DOCUMENTS

WO   WO2008087447   *   7/2008   ............ G06Q 30/00

* cited by examiner

*Primary Examiner* — James D Nigh
(74) *Attorney, Agent, or Firm* — Soquel Group LLC

(57) ABSTRACT

Batch pricing of digital media items by providing an electronic cart interface for use in managing a purchase of a plurality of digital media items, each digital media item having a status of priced or unpriced. The interface enables a user of the client device to interactively select a plurality of media items to be priced as a batch of digital media items, and to sequentially request one or more rights for each of the selected media items within the batch. The user may obtain a price for each selected media item that is based on the designated pricing model and the one or more rights requested the digital media right to be licensed for each media item.

11 Claims, 13 Drawing Sheets

BATCH PRICING OF DIGITAL MEDIA INDEPENDENT OF PRICING MODELS

TECHNICAL FIELD

Various embodiments generally relate to online pricing of digital media, and more particularly, but not exclusively, to batch pricing multiple digital media items independent of pricing and/or licensing models used for the multiple digital media items.

BACKGROUND

Online media licensing systems enable customers to search for, select, price and license digital media to be downloaded for subsequent use. Uses for digital media include advertising, incorporation into print publications such as newspapers and magazines, incorporation into online publications such as websites and blogs and personal consumption, such as listening to music at home.

Electronic commerce, or e-commerce, systems enable users to browse items for sale and add them to a cart prior to checkout or purchase. Typically the items are goods or services that have fixed prices. For example, the online e-commerce website of Amazon.com of Seattle, Wash., an e-commerce pioneer, enables a user to select a book, CD or DVD and add it to a cart. The user may checkout or may continue shopping. The behavior of the e-commerce system is independent of the intended use by the customer of the book, CD or DVD.

In contrast, digital media such as digital music and digital video is typically licensed under a set of licensing terms rather than purchased. Typically the user of a digital media system (DMS) that licenses digital media for professional or commercial purposes requests license rights using an interactive user interface running on a client computer. Then, the DMS computes the price for the requested rights and displays the price to the user.

Traditional online digital media systems that serve the needs of professional or commercial users typically offer two or more licensing models. Under the "rights managed" or RM licensing model, a digital media item is licensed for a specific set of rights. Licensed rights include, inter alia, time duration, geographic areas, and types of uses such as for print advertising, television, or web advertising and the like. Whereas under the "royalty free", or RF, license model, digital media is licensed for an unlimited time period and for any usage. License models usually have specific pricing or pricing models. For example, media licensed under a RF model usually has a single price which does not depend on the intended usage. In some cases RF media may have a price based on a pricing tier and the price may vary based on sizes or quality. For example, a large image or a high quality music clip may have a higher licensing price than a smaller or lower quality media item.

In many cases, a digital media item to be licensed does not have a single, set, price that can be displayed in a catalog or on a website. To determine a price, a prospective licensee, also referred to as a customer or user, must specify the rights requested for the digital media item and a price calculation must be performed. Thus, digital media items may have two states, priced and unpriced. Thus, it is with respect to these considerations and others that the present invention has been made.

SUMMARY OF THE DESCRIPTION

Various embodiments are directed towards a calculator and user interface useable in batch pricing digital media independent of a pricing and/or licensing model employed for the batch of digital media.

A process for batch pricing a plurality of media items is disclosed. The media items may have a plurality of different licensing models. This has the advantage of enabling a user to efficiently price multiple media items within the batch of digital media without regard to their licensing and/or pricing model.

A pricing navigator interface is disclosed that enables a user to view all media items selected for batch pricing and to select individual items to be priced, repricing, or deleted. The pricing navigator further enables the user to view a cumulative price of items that have been batch priced.

Embodiments further enable the user to price multiple media items in the batch within an electronic cart, having the effect of moving the priced media items from a price items window to a priced items window or from an unpriced items window to a priced items window. This is directed towards providing a clear indication of the price status of media items within the electronic cart.

In one embodiment, the user can select a set of rights requested for a media item and apply the selection to a plurality of media items of a same license model within the batch of digital media items. This is directed towards providing the advantage of streamlining the licensing process by reducing the number of steps required by the user to license a plurality of media items.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Preferred Embodiment, which is to be read in association with the accompanying drawings, wherein.

DETAILED DESCRIPTION

The invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the invention may be embodied as methods, processes, systems, business methods, or devices. Accordingly, the present invention may take the form of an entirely hardware embodiment, an entirely software embodiment or an embodiment combining software and hardware aspects. The following detailed description is, therefore, not to be taken in a limiting sense.

As used herein the following terms have the meaning given below:

User or customer—means an individual that uses a mobile device, PC or other electronic device capable of accessing a website, to search for digital media offered by an online digital media licensing system.

Digital media, media, or media item—means a file or unit of information stored in digital format that can be referred to, displayed or played. Digital media includes digital photographs, commonly referred to as "digital images" or simply "images", digital videos, vector art, Flash animations, sound files, and the like. For embodiments discussed herein, digital media may comprise content that was originally created digitally, or content that was converted from analog to digital format.

Metadata—means information that describes, or provides information supplemental to, digital media. Metadata may be included within the digital media files or stored separately in a database. Note that metadata refers to information that is intrinsic to the media asset such as its known subject, keywords that describe the media content, color model, media owner, media copyright holder, file format, and other information provided by a content provider or readily determined from the digital media content. Metadata may also refer to information that has been assigned to the media content such as price model or content category. Metadata enables or improves searching, browsing, filtering, matching and selection of media to purchase or license.

Figure 4:
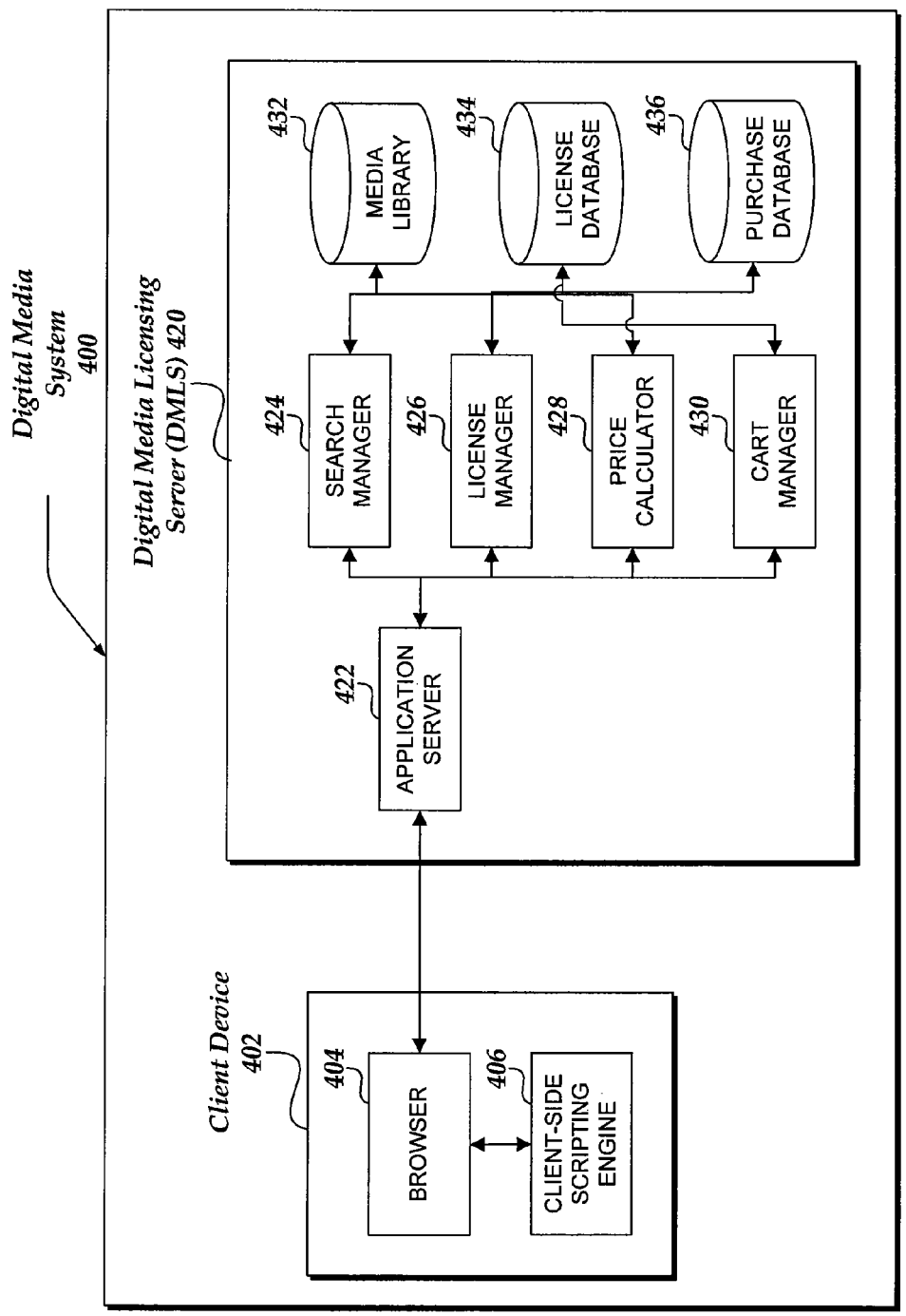
FIG. 4 is a block diagram for an online digital media system.

Digital media library—means a collection of digital media items that are stored on digital media and are accessed using a client computer. The digital media licensing system described herein with reference to FIG. 4 provides such a digital media library. Some embodiments of a digital media library are also referred to as a "stock media" library or "stock photo" library.

Checkout—means the process of paying for, or paying for a license to, items in an electronic cart. Additional functions may be performed during checkout, including, but not limited, to specifying a method of payment, changing a method of payment, deleting items, specifying a payee, selecting prints, transparencies, copies on media such as CD ROM and DVD ROM.

Batch pricing—means a fully or partially automated process for obtaining prices for licensing multiple media items as a collection of digital media items.

License model—means the terms and conditions, or rights and restrictions granted to a user. Common license models for digital media include royalty free and rights managed, described hereinafter.

Price model—means the method of pricing. As used herein, each license model also has an associated price model. Price model is also referred to as pricing model or pricing.

Embodiments of the present invention enable users of an online digital media licensing system (DMLS) to batch price digital media items that belong to different price models.

Embodiments of the present invention concern a system of managing an electronic cart that includes references to digital media stored or managed by a digital media library that is accessed using the World Wide Web, or simply "the Web". Media items are added to an electronic cart and then priced in preparation for checkout. Alternatively, media items may first be priced and then added to an electronic cart.

Some of the examples provided herein are described using digital media libraries that include digital images or digital images and digital video clips. However, various other embodiments are not so constrained. For example, other embodiments may be applied to digital media libraries that include any type of digital media or content, including, inter alia, images, music and sound, video, movies, graphics, web pages, and text documents.

Some of the examples of price models provided herein are disclosed using royalty free or rights managed and a derivative price model named rights simple. However, other embodiments may be applied to media items to which any type of price model may be applied, including inter alia, single play, and time limited. Thus, the invention is not to be constrained as being limited to the examples disclosed herein, and other embodiments using other variations are also envisaged as within scope of the invention.

Illustrative Operating Environment

Figure 1:
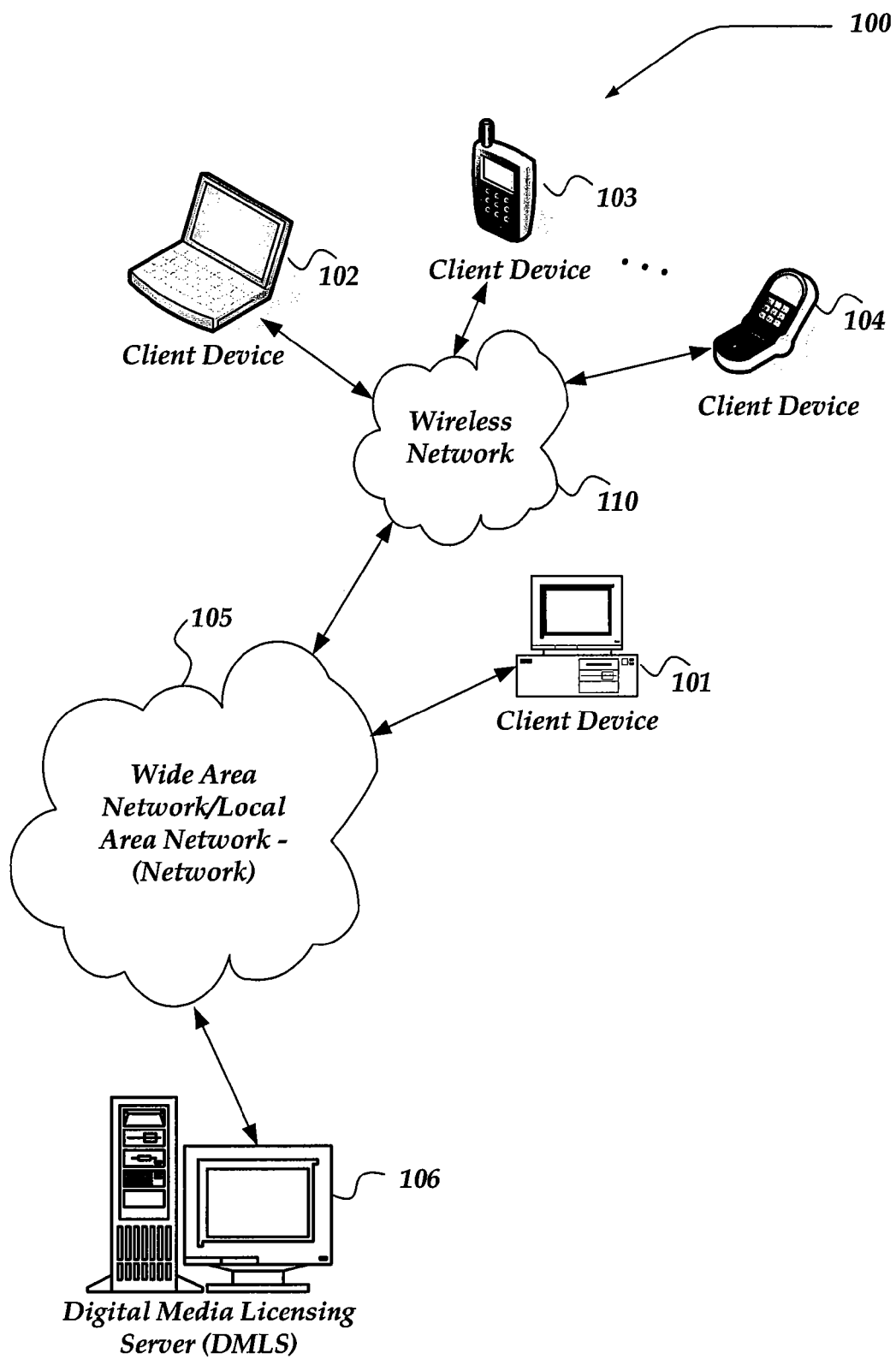
FIG. 1 illustrates a system diagram of one embodiment of an environment in which the invention may be practiced.

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes local area networks ("LANs")/wide area networks ("WANs")-(network) 105, wireless network 110, client devices 101-104, and Digital Media Licensing Server (DMLS) 106.

One embodiment of a client device usable as one of client devices 101-104 is described in more detail below in conjunction with FIG. 2. Generally, however, client devices 102-104 may include virtually any mobile computing device capable of receiving and sending a message over a network, such as wireless network 110, or the like. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, or the like. Client device 101 may include virtually any computing device that typically connects using a wired communications medium such as personal computers, multiprocessor systems, microprocessor-based or programmable consumer electronics, network PCs, or the like. In one embodiment, one or more of client devices 101-104 may also be configured to operate over a wired and/or a wireless network.

Client devices 101-104 typically range widely in terms of capabilities and features. For example, a cell phone may have a numeric keypad and a few lines of monochrome LCD display on which only text may be displayed. In another example, a web-enabled client device may have a touch sensitive screen, a stylus, and several lines of color LCD display in which both text and graphics may be displayed.

A web-enabled client device may include a browser application that is configured to receive and to send web pages, web-based messages, or the like. The browser application may be configured to receive and display graphics, text, multimedia, or the like, employing virtually any web-based language, including a wireless application protocol messages (WAP), or the like. In one embodiment, the browser application is enabled to employ Handheld Device Markup Language (HDML), Wireless Markup Language (WML), WMLScript, JAVASCRIPT, Standard Generalized Markup Language (SMGL), HyperText Markup Language (HTML), eXtensible Markup Language (XML), or the like, to display and send information.

Client devices 101-104 also may include at least one other client application that is configured to receive content from another computing device. The client application may include a capability to provide and receive textual content, multimedia information, or the like. The client application may further provide information that identifies itself, including a type, capability, name, or the like. In one embodiment, client devices 101-104 may uniquely identify themselves through any of a variety of mechanisms, including a phone number, Mobile Identification Number (MIN), an electronic serial number (ESN), mobile device identifier, network address, or other identifier. The identifier may be provided in a message, or the like, sent to another computing device.

Client devices 101-104 may also be configured to communicate a message, such as through email, SMS, MMS, IM, IRC, mIRC, Jabber, or the like, between another computing device. However, the present invention is not limited to these message protocols, and virtually any other message protocol may be employed.

Client devices 101-104 may further be configured to include a client application that enables the user to log into a user account that may be managed by another computing device, such as DMLS 106, or the like. Such user account, for example, may be configured to enable the user to receive emails, send/receive IM messages, SMS messages, access selected web pages, perform modeless searches and/or batch processing and licensing of digital media, or participate in any of a variety of other networking activity. However, managing of messages or otherwise participating in other networking activities may also be performed without logging into the user account.

Wireless network 110 is configured to couple client devices 102-104 with network 105. Wireless network 110 may include any of a variety of wireless sub-networks that may further overlay stand-alone ad-hoc networks, or the like, to provide an infrastructure-oriented connection for client devices 102-104. Such sub-networks may include mesh networks, Wireless LAN (WLAN) networks, cellular networks, or the like.

Wireless network 110 may further include an autonomous system of terminals, gateways, routers, or the like connected by wireless radio links, or the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G), 4th (4G) generation radio access for cellular systems, WLAN, Wireless Router (WR) mesh, or the like. Access technologies such as 2G, 2.5G, 3G, 4G, and future access networks may enable wide area coverage for client devices, such as client devices 102-104 with various degrees of mobility. For example, wireless network 110 may enable a radio connection through a radio network access such as Global System for Mobile communication (GSM), General Packet Radio Services (GPRS), Enhanced Data GSM Environment (EDGE), Wideband Code Division Multiple Access (WCDMA), Bluetooth, or the like. In essence, wireless network 110 may include virtually any wireless communication mechanism by which information may travel between client devices 102-104 and another computing device, network, or the like.

Network 105 is configured to couple DMLS 106, and client device 101 with other computing devices, including through wireless network 110 to client devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between computing devices.

One embodiment of a network device useable for DMLS 106 is described in more detail below in conjunction with FIG. 3. Briefly, however, DMLS 106 represents a network computing device that is configured to enable a user to search a digital media library, or database, select items and add them to an electronic cart and license media items for subsequent use. Furthermore, DMLS 106 provides a user interface to perform such searches and licensing activities independent of a price model and/or cost category associated with the digital media.

Devices that may operate as DMLS 106 include, but are not limited to personal computers, desktop computers, multiprocessor systems, microprocessor-based or programmable consumer electronics, network PCs, servers, network appliances, and the like.

Although DMLS 106 is illustrated as a distinct network device, the invention is not so limited. For example, a plurality of network devices may be configured to perform the operational aspects of DMLS 106.

Illustrative Client Environment

Figure 2:
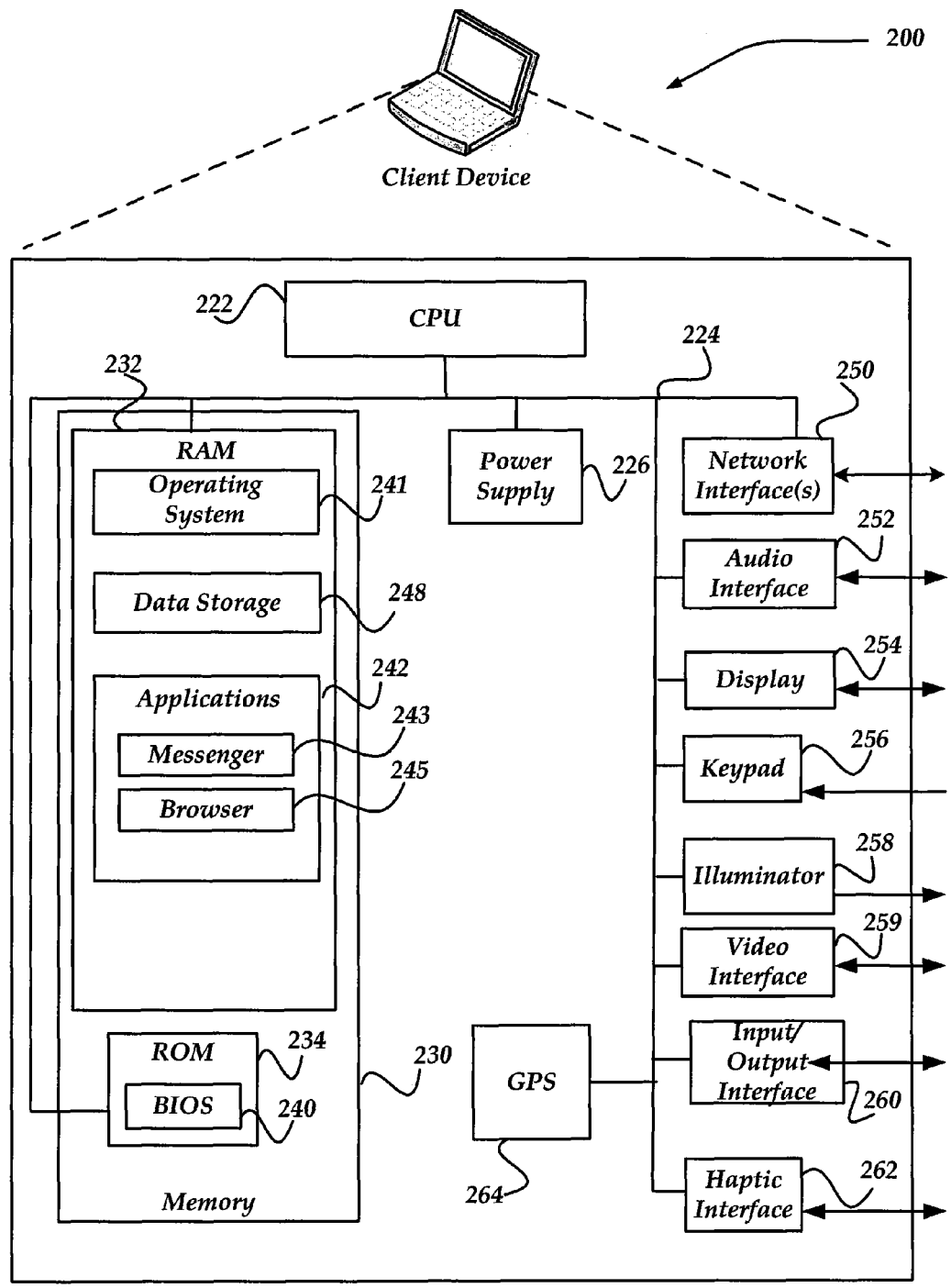
FIG. 2 shows one embodiment of a mobile device that may be included in a system implementing the invention.

FIG. 2 shows one embodiment of client device 200 that may be included in a system implementing the invention. Client device 200 may include many more or less components than those shown in FIG. 2. However, the components shown are sufficient to disclose an illustrative embodiment for practicing the present invention. Client device 200 may represent, for example, one of client devices 101-104 of FIG. 1.

As shown in the figure, client device 200 includes a processing unit (CPU) 222 in communication with a mass memory 230 via a bus 224. Client device 200 also includes a power supply 226, one or more network interfaces 250, an audio interface 252, video interface 259, a display 254, a keypad 256, an illuminator 258, an input/output interface 260, a haptic interface 262, and an optional global positioning systems (GPS) receiver 264. Power supply 226 provides power to client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling client device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, Bluetooth™, infrared, Wi-Fi, Zigbee, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Video interface 259 is arranged to capture video images, such as a still photo, a video segment, an infrared video, or the like. For example, video interface 259 may be coupled to a digital video camera, a web-camera, or the like. Video interface 259 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. In addition, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, Wi-Fi, Zigbee, or the like. Haptic interface 262 is arranged to provide tactile feedback to a user of the client device. For example, the haptic interface may be employed to vibrate client device 200 in a particular way when another user of a computing device is calling.

Optional GPS transceiver 264 can determine the physical coordinates of client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of client device 200 on the surface of the Earth. It is understood that under different conditions, GPS transceiver 264 can determine a physical location within millimeters for client device 200; and in other cases, the determined physical location may be less precise, such as within a meter or significantly greater distances. In one embodiment, however, a client device may through other components, provide other information that may be employed to determine a physical location of the device, including for example, a MAC address, IP address, or the like.

Mass memory 230 includes a RAM 232, a ROM 234, and other storage means. Mass memory 230 illustrates another example of computer readable storage media for storage of information such as computer readable instructions, data structures, program modules, or other data. Mass memory 230 stores a basic input/output system ("BIOS") 240 for controlling low-level operation of client device 200. The mass memory also stores an operating system 241 for controlling the operation of client device 200. It will be appreciated that this component may include a general-purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Memory 230 further includes one or more data storage 248, which can be utilized by client device 200 to store, among other things, applications 242 and/or other data. For example, data storage 248 may also be employed to store information that describes various capabilities of client device 200, as well as store an identifier. The information, including the identifier, may then be provided to another device based on any of a variety of events, including being sent as part of a header during a communication, sent upon request, or the like. In one embodiment, the identifier and/or other information about client device 200 might be provided automatically to another networked device, independent of a directed action to do so by a user of client device 200. Thus, in one embodiment, the identifier might be provided over the network transparent to the user.

Moreover, data storage 248 may also be employed to store personal information including but not limited to contact lists, personal preferences, data files, digital media, or the like. Data storage 248 may further provide storage for user account information. At least a portion of the information may also be stored on a disk drive or other storage medium (not shown) within client device 200.

Applications 242 may include computer executable instructions which, when executed by client device 200, transmit, receive, and/or otherwise process messages (e.g., SMS, MMS, IM, email, and/or other messages), multimedia information, and enable telecommunication with another user of another client device. Other examples of application programs include calendars, browsers, email clients, IM applications, SMS applications, VOIP applications, contact managers, task managers, transcoders, database programs, word processing programs, security applications, spreadsheet programs, games, search programs, and so forth. Applications 242 may include, for example, messenger 243, and browser 245.

Browser 245 may include virtually any client application configured to receive and display graphics, text, multimedia, and the like, employing virtually any web based language. In one embodiment, the browser application is enabled to employ Handheld Device Markup Language (HDML), Wireless Markup Language (WML), WMLScript, Standard Generalized Markup Language (SMGL), HyperText Markup Language (HTML), eXtensible Markup Language (XML), and the like, to display and send a message. However, any of a variety of other web-based languages may also be employed. In one embodiment, browser 245 is enabled to execute client-side scripting instructions written in client-side scripting languages including JAVASCRIPT™, Java, ActiveX, and the like. In one embodiment, browser 245 may interact with a client-side scripting engine, such as described in more detail below in conjunction with FIG. 4. In one embodiment, browser 245 is configured to use the Ajax (asynchronous JavaScript and XML) web development techniques that are used to create interactive web applications. Rather than referring to a specific standard or product, the term Ajax has come to represent a broad group of web technologies that can be used to implement a Web application that communicates with a server in the background, without interfering with the current state of web page. When web pages need to be updated, Ajax enables browsers to asynchronously request incremental pieces of information from the server instead of whole pages. Ajax typically works with XML and a client-side scripting language such as JAVASCRIPT or ActiveX.

Messenger 243 may be configured to initiate and manage a messaging session using any of a variety of messaging communications including, but not limited to email, Short Message Service (SMS), Instant Message (IM), Multimedia Message Service (MMS), internet relay chat (IRC), mIRC, and the like. For example, in one embodiment, messenger 243 may be configured as an IM application, such as AOL Instant Messenger, Yahoo! Messenger, .NET Messenger Server, ICQ, or the like. In one embodiment messenger 243 may be configured to include a mail user agent (MUA) such as Elm, Pine, MH, Outlook, Eudora, Mac Mail, Mozilla Thunderbird, gmail, or the like. In another embodiment, messenger 243 may be a client application that is configured to integrate and employ a variety of messaging protocols.

Illustrative Network Device Environment

Figure 3:
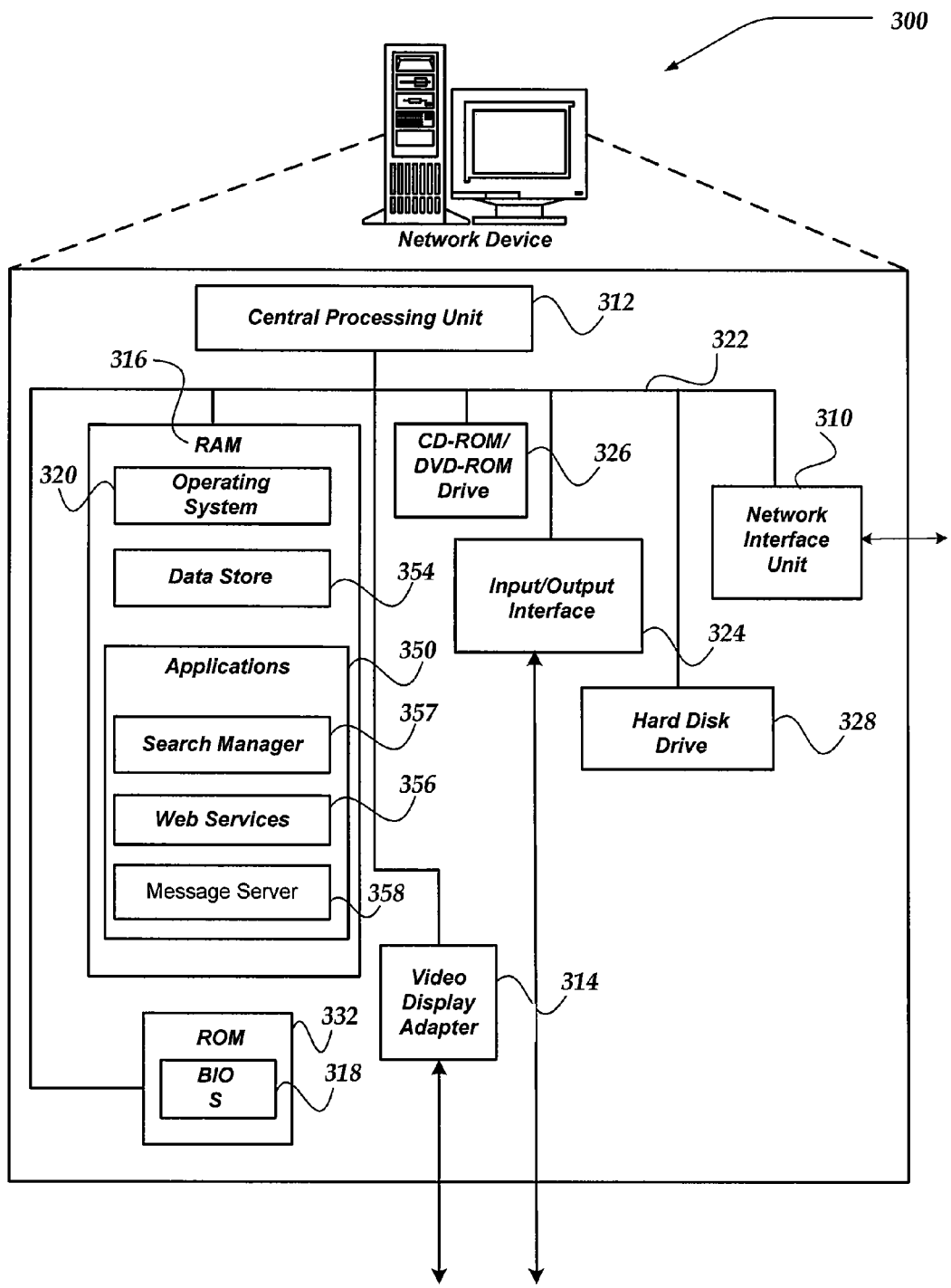
FIG. 3 illustrates one embodiment of a network device that may be included in a system implementing the invention.

FIG. 3 shows one embodiment of a network device, according to one embodiment of the invention. Network device 300 may include many more components than those shown. The components shown, however, are sufficient to disclose an illustrative embodiment for practicing the invention. Network device 300 may represent, for example, DMLS 106 of FIG. 1.

Network device 300 includes processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, and/or floppy disk drive. The mass memory stores operating system 320 for controlling the operation of network device 300. Any general-purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NIC).

The mass memory as described above illustrates another type of computer-readable media, namely computer storage media. Computer-readable storage media may include volatile, nonvolatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other physical medium which can be used to store the desired information and which can be accessed by a computing device.

The mass memory also stores program code and data. For example, mass memory might include data store 354. Data store 354 may be include virtually any mechanism usable for storing and managing data, including but not limited to a file, a folder, a document, or an application, such as a database, spreadsheet, or the like. Data store 354 may manage information that might include, but is not limited to, digital media including digital images and digital video clips, web pages, contact lists, identifiers, profile information, tags, labels, or the like, associated with a user, as well as scripts, applications, applets, and the like.

Data store 354 may further represent a plurality of different data stores. For example, data store 354 may represent a media library, a license database, and/or a purchase database, such as those described in more detail below in conjunction with FIG. 4.

One or more applications 350 may be loaded into mass memory and run on operating system 320. Examples of application programs may include transcoders, schedulers, calendars, database programs, word processing programs, HTTP programs, customizable user interface programs, IPSec applications, encryption programs, security programs, VPN programs, web servers, account management, and so forth.

Applications 350 may also include an application server, license manager, price calculator, and/or a cart manager, such as those described in more detail below in conjunction with FIG. 4. Applications 350 further may include web services 356, search manager 357, and message server (MS) 358.

Web services 356 represent any of a variety of services that are configured to provide content, including messages, over a network to another computing device. Thus, web services 356 include for example, an application server, a web server, a messaging server, a File Transfer Protocol (FTP) server, a database server, a content server, or the like. Web services 356 may provide the content including messages over the network using any of a variety of formats, including, but not limited to WAP, HDML, WML, SMGL, HTML, XML, cHTML, xHTML, or the like. Web services may also include server-side scripting languages such as PHP, Python, and Java servlets. Web services 356 may also include the server side of the Ajax web development method that enables a server to asynchronously respond to Ajax requests. The server-side Ajax component can be implemented using any server-side technology that can dynamically deliver information in XML format.

Search manager 357 enables a user of a client device such as client device 200 to search media in a digital library by interpreting search requests and performing the corresponding searches from a digital media library that may reside in data store 354, or the like. Search manager 357 may include a relational database manager that manages one or more logical databases, each of which reside in data store 354.

Message server 358 may include virtually any computing component or components configured and arranged to forward messages from message user agents, and/or other message servers, or to deliver messages to a local message store, such as data store 354, or the like. Thus, message server 358 may include a message transfer manager to communicate a message employing any of a variety of email protocols, including, but not limited, to Simple Mail Transfer Protocol (SMTP), Post Office Protocol (POP), Internet Message Access Protocol (IMAP), NNTP, or the like.

However, message server 358 is not constrained to email messages, and other messaging protocols may be managed by one or more components of message server 358. Thus, message server 358 may also be configured to manage SMS messages, IM, MMS, IRC, mIRC, or any of a variety of other message types.

Generalized Operation

The operation of certain aspects of the invention will now be described with respect to FIGS. 4-12. FIG. 4 provides a general system diagram of an overall digital media system in which the subject invention may operate. FIGS. 5-11 provide embodiments of aspects of a digital media search, electronic cart, and batch pricing interface. FIG. 12 provides a general flow diagram of one embodiment of a process useable in performing batch pricing of multiple media items.

Reference is now made to FIG. 4, which is one embodiment of a block diagram for an online digital media licensing system. Digital Media System 400 enables one or more client devices 402 to access a library of digital media managed by a digital media licensing server (DMLS) 420, such as digital media licensing server 106, across a network, such as wide area/local area network 105. In one embodiment, source content from one or more different sources is ingested, processed, and made available by DMLS 420. Client device 402 represents one embodiment of client devices 101-104 of FIG. 1. DMLS 420 is a network device such as network device 300 described above in conjunction with FIG. 3, and further in conjunction with DMLS 106 of FIG. 1. Typically a user uses browser 404, running on client device 402 to access DMLS 420. One embodiment, of browser 404 is described in more detail above in conjunction with FIG. 2 (see browser 245). The user interface provided by browser 404 enables the user to perform a range of functions related to licensing digital media including browsing, searching, and viewing media items, obtaining pricing for media items, adding media items to an electronic cart, licensing media items and downloading media items across the network onto client device 402.

In one embodiment, when a user accesses DMLS 420 using client device 402, DMLS 420 downloads web pages in HTML format to browser 404 for viewing and interactive use. To perform some of the advanced client-side interactive functions, described with respect to FIGS. 5-9, the web pages may include programming language instructions in a client-side scripting or programming language such as JAVASCRIPT from Sun Microsystems, the Java open source programming language, Flash from Adobe Systems Inc., ActiveX from the Microsoft Corporation, or the like. Typically instructions in such a client-side scripting language are embedded in HTML web pages and are interpreted by a client-side scripting engine 406 that is embedded in or controlled by browser 404. Client-side scripting engine 406 enables browser 404 to perform functions not available through HTML commands such as advanced graphics, database access, and computations.

In one embodiment, JAVASCRIPT is used as the client-side scripting language. JAVASCRIPT is a trademark of Sun Microsystems of Mountain View, Calif. JAVASCRIPT is supported by most commercial browsers including Mozilla Firefox, Microsoft Internet Explorer, and Apple Safari. For purposes of specificity, all of the client-side capabilities described herein can be accomplished using browser 404 in conjunction with in conjunction with JAVASCRIPT version 1.5, or greater. A description of JAVASCRIPT version 1.5 may be found in the book *JavaScript: The Definitive Guide*, by David Flanagan, August 2006, published by O'Reilly Media, Inc., which is incorporated herein by reference. In one embodiment, JAVASCRIPT commands are embedded inside HTML files and are processed by a JAVASCRIPT engine 406. A JAVASCRIPT utility framework may be used to assist in defining and manipulating common objects and classes. One such JAVASCRIPT framework is named MooTools, an open source project. A complete reference for MooTools can be found in the book *MooTools Essentials: The Official MooTools Reference for JAVASCRIPT™ and Ajax Development*, by Aaron Newton, published in 2008 by APress.

Browser 404 issues requests using the hypertext transfer protocol (HTTP) to an application server 422. Application server 422 receives the HTTP requests and invokes the appropriate digital media licensing server software module to process the request. Application server 422 may be a commercially available application server that includes a web server that accepts and processes HTTP requests from 404 and serves or transmits HTTP responses back to browser 404 along with optional data contents, which usually are web pages such as HTML documents and linked objects (images, or the like). In addition, browser 404 may use Ajax to issue requests for XML-coded information that is delivered asynchronously by application server 422. Henceforth, the term request message refers to a message sent by browser 404 using HTTP, Ajax or other client-server communications method to application server 422. A response message refers to a message sent in response, typically using the same communications method, by application server 422 to browser 404.

In one embodiment, application server 422 establishes and manages user sessions. Typically application server 422 assigns each user session a unique session id. A user session lasts from the time a user logs in, or access DMLS 420 from browser 404, until the time the user customer logs out or stops interacting with DMLS 420 for a specified period of time. In addition, application server 422 manages server applications and provides database connectivity.

DMLS 420 also includes a search manager 424, license manager 426, price calculator 428, and cart manager 430.

Search manager 424 responds to search requests made by client device 402 by searching media library 432 for media items that match the criteria included in the search requests. In one embodiment, a search request is formatted as an HTML form. Search manager 424 may include a commercial relational database manager such as Oracle from the Oracle Corporation, SQL Server from the Microsoft Corporation, or the like. However, virtually any other database manager may also be used. In one embodiment, search manger 424 transforms HTML formatted search requests into a SQL query and uses a commercial relational database manager to search for media items that satisfy the query.

Media library 432 stores digital media items and metadata for each media item. Typically digital media items and metadata are stored and retrieved using a database management system. In one embodiment, each media item is described by a database record that includes fields such as those listed and described in Table 1 below:

TABLE 1

Database Fields For A Media Item

| Name Of Field | Description |
| --- | --- |
| Unique ID | Unique identifier for the media item. Used as key to access database information about the media item. |
| Title | Title of media item. Displayed to user. |
| Price model | Price model used for licensing the media item. |
| Collection | The media collection(s) that the media item belongs to. |
| Subcollection | The subcollection(s) that the media item belongs to. |
| Keywords | Keywords used for searching. |
| Categories | The categories that the media item belongs to. |

In another embodiment, the fields listed in Table 1 are stored as a relational table using a relational database management system where the Unique ID field serves as the key. In one embodiment, digital media items such as digital images and digital video clips are stored outside the relational database in media library 432 and a unique identifier which references the media item is stored inside the database. In another embodiment, digital media items such as digital images and digital video clips are stored as binary large objects (BLOBS) within the relational database.

License manager 426 responds to requests for license information for one or more media assets by querying a license database 434 for license information regarding the media items referenced in the request. Such requests for license information include, inter alia, terms of availability and any special pricing. License manager 426 responds to requests to validate the availability for licensing of a media item during the checkout process, as discussed later with reference to FIG. 7A. To accomplish this, license manager 426 reviews information regarding licenses to the media item currently in force, stored in license database 424, to determine if the rights being requested are available. In one embodiment, a request for license information is formatted as an HTML form. License database 434 may include a commercial relational database manager such as Oracle from the Oracle Corporation, SQL SERVER from the Microsoft Corporation, or the like. However, other database managers may also be included. In one embodiment, HTML formatted license information requests are transformed into SQL queries which are resolved by the relational database manager.

License database 434 stores license information including pricing and license terms for each price model. It also stores any special information about individual media items. For example, a media item, such as a photo of a famous actor, may be prohibited from being used for an advertisement for an alcoholic beverage. Or, for example, a media item may have special pricing such that it doesn't fit into a standard price model. When a rights managed media item, e.g., a media item to which a rights managed price model is applied, is licensed, the key terms of the license, including the rights licensed, are stored in license database 434. The key terms include, inter alia, the time period, geographic coverage, intended usage, and/or any other constraints placed on licensing of the associated digital media item.

Price calculator 428 responds to requests for prices by calculating the price for licensing each media item included in the request according to the rights requested. License manager 428 uses price information and pricing policies stored in license database 434 to compute the licensing prices. Licensing terms that price calculator 428 may take into account in computing a price include, inter alia, price model (royalty free, rights managed, or other royalty model), usage (e.g. magazine, newspaper, or web), size (quarter page, half page, full page), duration (e.g. 1 time usage, recurring over a period of time), geographic coverage (e.g. US only, Europe only, worldwide), or the like.

In one embodiment, pricing for a media item is based solely on the price model to which it belongs. For example, there may be three tiers of royalty free pricing, a lower priced "value" pricing tier, and moderately priced "premium" pricing tier, and a higher priced "deluxe" pricing tier. If a media item is categorized in the value pricing tier, then the price to license the media items depends solely on the quality or size of the media item selected. One non-limiting example of such a RF price model is given below in Table 2 for the case of digital images where the price is based on the size, as measured in pixel dimensions, of the digital image requested by the user. As an example of how price calculator 428 would use Table 2, if the user selected a premium RF image and then requested an image of 960 pixels high by 1280 pixels wide, the price would be $325 USD. Typically, images are only available in preset sizes such as those listed in Table 2. The various sized images are typically generated from the largest image available by DMLS 420 either in advance and stored as a "pack" of images in media library 432 or on the fly prior to download by the user.

TABLE 2

Example Pricing for Royalty Free Model

| Image Size (in pixels) | Value RF Pricing | Premium RF Pricing | Deluxe RF Pricing |
| --- | --- | --- | --- |
| 480 × 640 | 55.00 USD | 95.00 USD | 295.00 USD |
| 960 × 1280 | 155.00 USD | 255.00 USD | 495.00 USD |
| 1800 × 2400 | 225.00 USD | 325.00 USD | 575.00 USD |
| 4090 × 5440 | 295.00 USD | 395.00 USD | 725.00 USD |

A variety of techniques may be used to price rights managed (RM) media. In one embodiment, a RM pricing table is stored that lists a base price for each RM pricing tier and an incremental price for each right that may be requested. One non-limiting example of such a technique for RM pricing is given below in Table 3 for the case of premium tier RM digital images where the price is based on three rights: size at which the image will be displayed, duration of use, exposure (e.g., in what media will the image be used). As an example of how price calculator 428 would use Table 3, if the user selected a premium tier RM image and then requested that the image be displayed at ⅛ page, for 1 month, in printed form only, the price would be $1350 (500 base price+100+250+500). Three non-limiting example user interfaces that enable a user to specify the rights requested for a digital image and to obtain a price are described below with reference to FIGS. 8, 10 and 11.

TABLE 3

Example Pricing for Rights Managed Model - Premium Tier
(All prices in USD)

| Base Price | | | | | |
|---|---|---|---|---|---|
| Display Area | 500 Price | Duration | Price | Exposure | Price |
| ⅛ Page | 100 | 1 Day | 50 | Print Only | 500 |
| ¼ Page | 200 | 1 Week | 150 | Web only | 500 |
| ½ Page | 300 | 1 Month | 250 | Print & Web | 750 |
| Full Page | 400 | 1 Year | 1000 | — | — |

Cart manager 430 responds to request messages to update information about electronic carts that it manages for each customer. Cart manager 430 creates a cart for a user when he/she first adds at least one item to the cart. Cart manager 430 maintains the cart in a purchase database 436. Cart manager 430 maintains the contents of the cart between user sessions. Thus, if a customer logs out or simply stops or terminates interacting for a period of time, and as a result their user session terminates, cart manager 430 retains the user's cart until he/she next logs in, thereby providing a persistent shopping cart. Thus, when a user begins a new session cart manager 430 updates the contents of the cart with information stored from the previous user session. In one embodiment, information stored for a cart in purchase database 436 includes the name of the user, a unique session identifier used to reference the session, the unique ID of each media item in the cart, the price quoted to license each media item, an indicator as to each media item has yet been priced, and the like.

Each time a user performs an action that changes the state of the items in his/her cart, browser 404 sends a message requesting that cart manager 430 update the user's cart stored in purchase database 436 accordingly. Actions a user may perform on their cart include, inter alia, adding items to a cart, deleting items from a cart, pricing items in a cart (including batch pricing of items in a cart), moving items from an unpriced items window to a priced items window, moving items from a priced items window to an items to checkout window, and checking out.

In one embodiment, a cart may include priced and unpriced media items, where a priced media item has been priced using price calculator 428, and an unpriced media item has not yet had a provided by price calculator 428.

Figure 5:
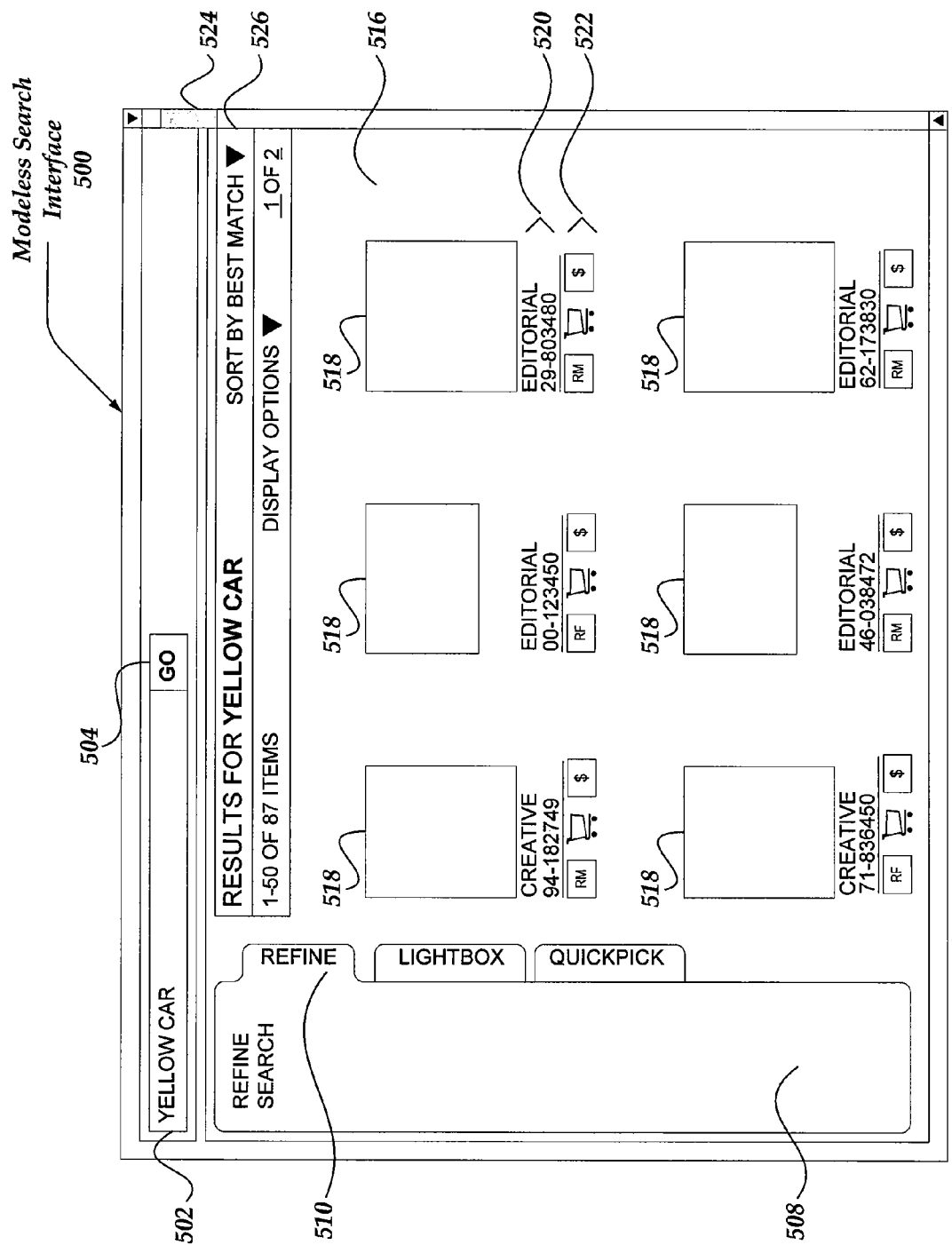
FIG. 5 is one embodiment of a user interface of a modeless search interface for searching for digital images from a digital media library.

Reference is now made to FIG. 5, which is one embodiment of a user interface of a modeless search interface for searching for digital images from an image library. In one embodiment, modeless search interface 500 is a component of digital media licensing system 400 and interacts with DMLS 420. A user of client device 402 uses modeless search interface 500 to specify search criteria to be used to search a digital media library.

Modeless search interface 500 includes a search input field 502, a go control 504, a floating search assistant 508 with three tabs, and a main window 516. Modeless search interface 500 may include many more or less components than those shown in FIG. 5. However, the components shown are sufficient to disclose an illustrative embodiment for practicing the present invention.

Search input field 502 enables a user to enter one or more search terms, also referred to as keywords. Search terms persist in the input field during the current session only. If the user starts a new session default placeholder text, e.g. "Enter Search Terms Here" is displayed.

Search assistant 508 is a window with one or more tabs. In one embodiment, search assistant 508 may be implemented using a JAVASCRIPT layer object. In one embodiment, search assistant 508 has one tab: a refine search tab 510. However, other tabs such as a lightbox tab or a quickpick tab may also be included. Moreover, although search assistant 508 is illustrated on a 'left' side of modeless search interface 500, the invention is not so limited. For example, search assistant 508 may also be displayed on a right side, or even at a bottom of modeless search interface 500.

Refine search tab 510, described in further detail with reference to FIG. 6, enables the user to specify additional search criteria. At any time, the user may initiate a search of the media library by selecting go control 504. This causes browser 404 to send a search request message that includes the search criteria specified by the user to application server 422. The requested search of medial library 432 is performed by search manager 424 which sends a response message that includes an image thumbnail 518 and a set of descriptive metadata 520 for each media item in the media library 432 that matches the search criteria. Browser 404 then displays the image thumbnails 518 and metadata 520 in main window 516. A progress animation is displayed in main window 516 while DMLS 420 is performing the search, e.g., while the user is waiting for the search results to be displayed.

Main window 516 may extend beyond the visible portion of the window. The nonvisible portions of main window 516 are accessed using main window position control 524. Typically main window 516 can accommodate a preset number of image thumbnails 518, for example 50 or 100. If the search results are greater than the preset number than additional pages are used to access the additional image thumbnails 518.

A search results information bar 526 displays descriptive information about the most recent search and provides several controls. Results information bar 526 displays the text: Results for <Search terms>. The field <search terms> is replaced by the search terms entered into search input field 502. Thus, in the present example, information bar 526 displays the text "Results for YELLOW CAR." Additionally, search results information bar 526 provides a sort control entitled "SORT BY BEST MATCH." In one embodiment, the sort control enables the user to sort according to the best or closest match, the date the media was created, and the date the media was added to the digital library. Search results information bar 526 provides information about which search results are being viewed. The text "1-50 OF 87 ITEMS" indicates that of the 87 media items that matched the search criteria, the first fifty are available for viewing in main window 516. A display options control enables the user to select between viewing image thumbnails, image thumbnails and labels, and image thumbnails and details.

Finally, results information bar 526 includes a page number control. The page number control displays the current page number and the total number of pages of search results available. The user can select or enter a different page number and the appropriate results are displayed in main window 516.

In the example depicted in FIG. 5, modeless search interface 500 displays three elements for each media item, an image thumbnail 518, descriptive metadata 520, and several media item controls 522. Image thumbnail 518 is computed by DMLS 420 from the actual media item stored in media library 432. For example, if the media item is an image then the thumbnail may be a reduced resolution version of the thumbnail. If the media item is a sound clip then a static image, perhaps showing a musical note, may be used. If the media item is a video clip then a key frame selected from the video clip may be used. It may be appreciated by one skilled in the art that there are many ways to represent media clips using image thumbnails. Further, in one embodiment, the size of the image thumbnails to be displayed may be selected by the user.

In the example shown in FIG. 5, two descriptive metadata elements 520 are depicted immediately underneath each image thumbnail 518: (1) the word CREATIVE or EDITORIAL which indicates whether the media item is categorized as creative or editorial content, and (2) the Unique ID for the media element in the form of an alphanumeric string.

Below the metadata elements 520 are a set of media item controls 522. Table 4 below provides a non-limiting, non-exhaustive example of possible media item controls 522 and explains their functions. It may be appreciated that additional metadata and item controls may be added or substituted for those described herein.

TABLE 4

Media Item Controls

| Name Of Control | Function |
| --- | --- |
| Related images | Show all images related to this one. |
| Get price | Obtain pricing for the media item and optionally add it to the cart. |
| Add to cart | Add the media item to the cart and continue browsing. |

It may be appreciated by one skilled in the art that each of media item controls 522, as described above in Table 4, operates identically or modelessly on media items that belong to any category. For example, regardless of what price model, or category, is applied to a media item, it can be priced or added to a cart using the same sequence of steps using modeless search interface 500.

Figure 6:
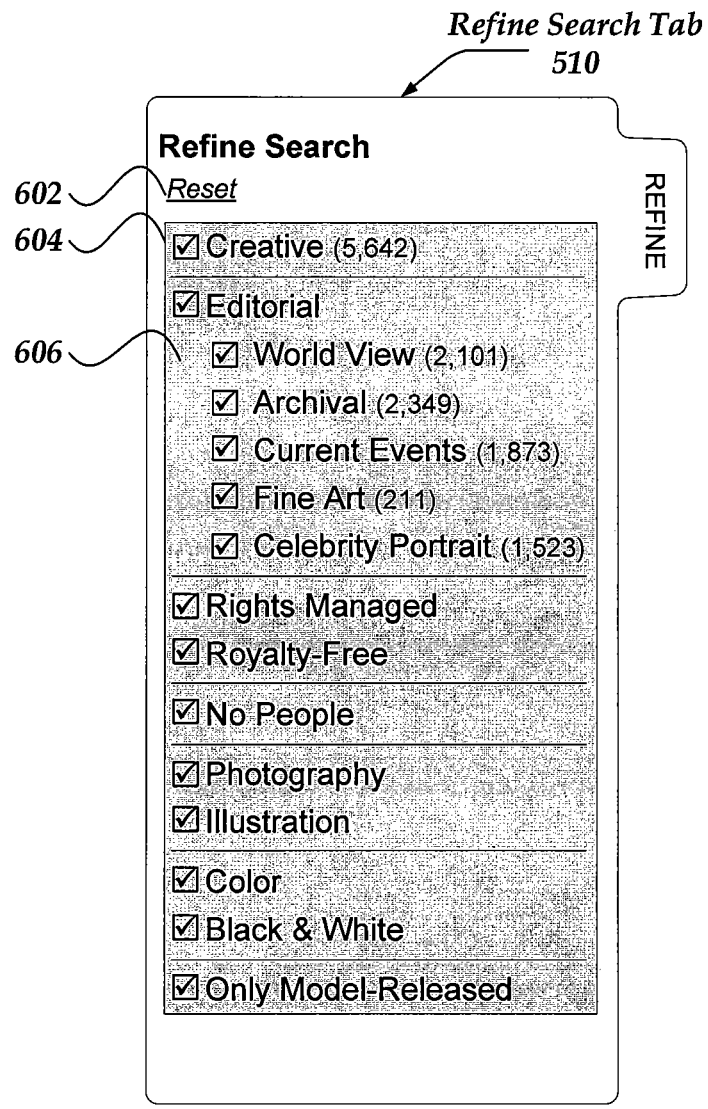
FIG. 6 is one embodiment of a user interface for refining criteria to be used when modelessly searching for digital images from a digital media library.

Now reference is made to FIG. 6, which is one embodiment of a user interface for refining criteria to be used when modelessly searching for digital images from a digital media library. FIG. 6 depicts one embodiment of refine search tab 510 that is specific to searching a library of digital images. Initially, all categories listed in a filter list 604 in refine search tab 510 are selected, i.e. their respective checkboxes are checked. When a category is selected, all media elements in media library 432 that belong to the category are included in the search. Thus, searches performed using the default setting refine search tab 510, in which all categories are selected, are performed across all media items in media library 432 regardless of what category they belong to. The user may specify search criteria by clicking off, or on, appropriate checkboxes within filter list 604. In the example depicted in FIG. 6 all checkboxes in filter list 604 are checked, showing the default setting. In this case a search will be performed across all images in media library 432. If a user is interested only in creative images he/she would uncheck the checkbox named "Editorial" in filter list 604. If a user is interested only in royalty free images he/she would uncheck the checkbox named "Rights Managed (RM)" in filter. list 604. It may be appreciated by one skilled in the art that this is one example of a modeless search. For example, the user can ignore the modality of "price model" by simply leaving checked the two checkboxes that correspond to the rights managed and royalty-free categories of price model. The user may focus attention upon categories of interest and doesn't need any previous knowledge of how a media item is categorized in order to perform a search that would return the media item as a match.

The user may specify specific subcategories of editorial images by checking the checkbox named "Editorial" and then checking any of the subcategory checkboxes 606. For example, if the user is interested in searching for celebrity portraits he/she would check "Editorial" and "Celebrity Portrait." Checking "Editorial" enables the subcategory checkboxes which include "Celebrity Portrait."

If a user selects a set of filters that will result in no matches, a message will display in main window 516 informing the user as such and the search will not be run. For example, if the checkboxes for both "Creative" and "Editorial" are unchecked then no images will be searched.

Clicking on a reset control 602 resets all checkboxes in filter list 604 to the default state, which in this example is the state in which all categories are selected.

It may be appreciated that refine search tab 510 makes it easy for a user to select specific categories from which to search for media items within media library 432. Categories represented in filter list 602 include:

Type of collection—creative, editorial collection, or the like

Subcollection—an optional subcategory within the creative or editorial collection Price model—rights managed versus royalty-free price model Color model—color versus black and white color model Type of content—photography versus illustration It may be appreciated by one skilled in the art that additional categories and additional elements within the abovementioned categories may be implemented using refine search tab 510. For example, price model categories may include hybrid schemes in which there are tiers of royalty free pricing based on usage, color model can also include RGB and CMYK color schemes, and type of content could include music and digital video.

Figure 7A:
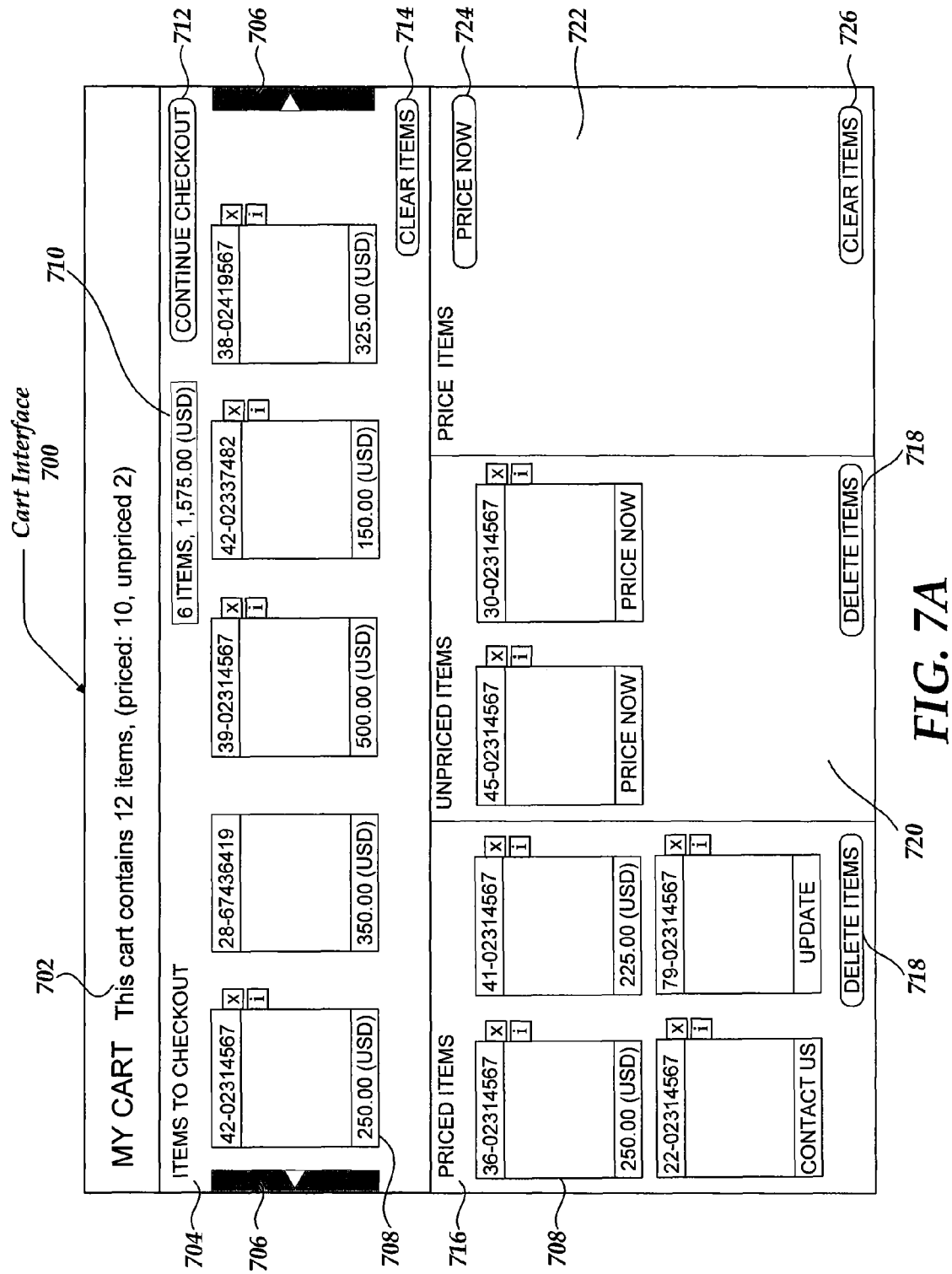
FIG. 7A is one embodiment of a user interface for an electronic cart that holds priced and unpriced digital media items.

FIG. 7A illustrates one embodiment of a user interface for an electronic cart that holds priced and unpriced digital media items. The user is given the option to go to or access his/her electronic cart when he/she uses modeless search interface 500 to add a media item to the electronic cart. In one embodiment, each user interface provided by client device 402 includes a control which when selected takes the user directly to the cart. An item count message 702 indicates the total number of media items in the cart and the number which are priced and unpriced. In one embodiment, cart interface 700 includes four principal windows: items to checkout window 704, priced items window 716, unpriced items window 720, and price items window 722. Each of the four windows may include one or more cart items 708. Cart item 708, which is described in further detail with reference to FIG. 7B, represents a single media item and provides a number of controls that can be used to perform cart-related functions on the media item.

Figure 7B:
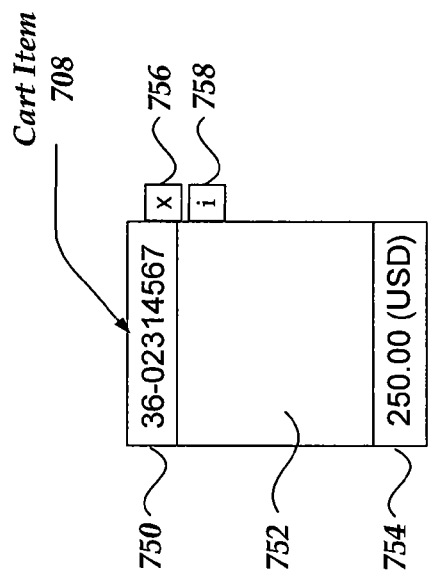
FIG. 7B is one embodiment of a cart item that represents a media item inside an electronic cart.

FIG. 7B illustrates one embodiment of a cart item that represents a media item inside an electronic cart. In this embodiment, cart item 708 includes unique id 750, cart item 752, price indicator 754, delete control 756, and information control 758. Unique id 750 uniquely identifies the media element and linking it to a corresponding media item residing in media library 432. Cart item 752 provides a visual representation of the media item. In one embodiment cart item 752 is identical to image thumbnail 518. Price indicator 754 may show a price or alternatively, it may include a message that suggests an action to be taken by the user. Some of the messages and recommended actions to be taken by the user are provided below in Table 5.

TABLE 5

Price Indicator Messages And Associated Actions

| Message | Recommended User Action |
|---|---|
| PRICE NOW | The item has not yet been priced. User may click on the price indicator to price the item. |
| CONTACT US | A problem has been encountered. User should contact the provider of the system, using a provided interface. |
| UPDATE | There has been a change which may affect the price for the item. User should click on the price indicator to update the price. |

In one embodiment, browser 404 of FIG. 4 sends an Ajax request message to application server 422 to update price indicator 754 when a condition that results in a change to the licensing status of the corresponding media item changes, for example, if a change of license price or a rights conflict occurs. Because the Ajax communication method is used, application server 422 updates browser 404 with information asynchronously, e.g., whenever a licensing status of a cart item occurs.

In one embodiment, when the user selects price indicator 754 when the "CONTACT US" message is displayed, instructions are provided as to how to contact the system. In one embodiment, an interactive chat session is initiated and a human representative of the system provides information to the user. For example, it may be that the media item has been exclusively licensed by another user between the time that the user placed the item in the cart and the present moment. In this case, the human representative might be able to recommend alternative media items that are available for licensing.

Selecting close control 756 has the effect of deleting the media item from the cart. Clicking information control 758 has the effect of displaying additional information about the media item. Such information may include, but is not limited to, licensing restrictions, the date the media item was created, and descriptive information about the media item.

Returning now to FIG. 7A, items to checkout window 704 displays media items that have been priced and validated and are ready to checkout. The process of pricing one or more media items is described below with reference to unpriced items window 720 and price images window 722. The process of validating a media item is performed when an item is added to items to checkout window 704. The validation process identifies any issues that may occur during the checkout, or payment, process in advance so that when the user decides to proceed with checkout he/she is assured that the checkout process will proceed smoothly, e.g., without interruption. Most importantly, validation identifies rights conflicts that may prevent the requested rights from being available for licensing.

When a media item is added to items to checkout window 704, browser 404 sends a validation request message requesting validation of the media item. Application server 422 routes the message to license manager 426 which determines if the license rights requested by the user when he/she priced the media item are available at this time. After verifying whether the requested rights are available, license manager 426 sends a response message to browser 404. If the rights being requested by the user are available, license manager 426 sends an affirmative response indicating that the media item was successfully validated. In this case, the corresponding cart item 708 displays in items to checkout window 704.

If license manager 426 detects an error during validation it sends a negative response to browser 404 indicating that validation was unsuccessful and that the rights requested are not available. In this case, browser 404 displays an error message. In one embodiment, the user is given an option to initiate an interactive chat session with a human representative. For example, it may be that the user requested worldwide advertising rights for a specified period of time but the media item has since been exclusively licensed in certain geographic territories by another user. In this case, the human representative might be able to identify the territories where the media item is available for use or suggest an alternative media item that is available for licensing. It should be noted, however, that the invention is not constrained to managing errors through a human representative. For example, in another embodiment, an interactive artificial intelligence or knowledge based system might be employed to provide resolution to an error, or to otherwise assist.

In one embodiment, if there are no items in items to checkout window 704 a message displays that indicates as such. An item count and total price message 710 displays inside items to checkout window 704. Item count and total price message 706 displays the total number items in items in checkout window 704 and the cumulative price it will cost to license the items.

The user can select a continue checkout control 712 which will take the user to the checkout interface, which enables the user to pay for the items in the cart. A variety of standard checkout interfaces may be provided, each of which enables the user to pay for the items in the cart. Typically, the user provides credit card information or an account identifier in the case that they or their company has a pre-existing payment account. Once a media item has been successfully purchased, or licensed, then it may be downloaded for use. Alternatively, the user can select a clear items control 714 that clears, or deletes, all media items from the cart. Cleared cart items are returned to priced items window 716 where they are displayed.

Priced items window 716 displays cart items 708 that have already been priced. Using click and drag or a comparable user interface mechanism the user may move one or more cart items from priced items window 716 to items to checkout window 704. The action of moving a cart item 708 to items to checkout window 704 prompts browser 404 to initiate validation for the cart item 708. In one embodiment, if the user selects more than one cart item 708 to move then the cart items 708 are validated and moved sequentially.

In one embodiment, upon dragging a cart item 708 from priced items window 716 to items to checkout window 704, items populate the items to checkout window 704 from left to right and a processing animation displays over the item as it is validating. In this embodiment, visible placeholders for each cart item 708 being moved remain in priced items window 716 until validation has completed. Cart items 708 that are successfully validated appear in items to checkout window 704 and the processing animation is removed for the cart item 708. Cart items 708 that fail validation may, in one embodiment, snap back to the corresponding placeholders in priced items window 716 and appropriate alert messages are displayed.

Unpriced items window 720 displays cart items 708 for media items that have been added to the cart but which have not yet been priced. Typically, price indicator 754 displays the message "PRICE NOW" for each cart item 708 in unpriced items window 720. There are several ways in which the user may obtain a price for a cart item 708 in unpriced items window 720: (1) the user can select price indicator 754, (2)

the user can drag one or more cart items 708 to priced items window 716, (3) the user can drag one or more cart items 708 to items to check out window 704, and (4) the user can drag one or more cart items 708 to price images window 722 and subsequently select a price now control 724. In cases 1, 2, and 4 above, a cart item 708 that is successfully priced moves to priced items window 716. In case 3, the cart item 708 must be priced and then validated before moving to items to checkout window 704.

Both priced items window 716 and unpriced items window 720 offer a delete items control 718. When the user selects one or more cart items 708 and then selects delete items control 718 the selected cart items 708 are deleted from their respective window, that it they are deleted from the cart itself.

Price images window 722 holds cart items 708 that have been moved into it by the user from unpriced items window 720. When the user selects price now control 724, client device 402 enables the user to batch price each of the cart items 708 in price images window 722 as described with reference to FIGS. 8-11. In one embodiment, a user can move cart items 708 from items to checkout window 704 or priced items window 716 to price items window 722 with the objective of repricing the items.

It may be appreciated by one skilled in the art that cart interface 700 distinguishes between cart items 708 in items to checkout window 704 that are ready to be licensed, cart items 708 in priced items window 716 that have been priced but not yet validated, and cart items 708 in unpriced items window 720 that have been neither priced nor validated. This makes the status each cart item and the potential actions that can be performed on each cart item explicit to the user.

As previously discussed, cart information is maintained and stored by cart manager 430 in purchase database 436 and cart information is persistent across user sessions. In one embodiment, information about items in items to checkout window 704 is not persistent. When a user starts a new user session any cart items that appeared in items to checkout window 704 during the previous user session now appear in priced items window 716. In this embodiment, the user must explicitly move any desired items to items to checkout window 704, and the items must be validated before selecting continue checkout control 712 to initiate check out.

Pricing

Typically, in order to obtain a price to license a media item, the user first interacts with a pricing user interface to request a set of rights to the media item. The pricing user interface enables the user to request rights by, inter alia, entering information and/or making selections. The information and/or selections provided by the pricing user interface depend on the price model that will be applied to the media item. While a wide variety of price models may be employed for licensing digital media, typically they are categorized as rights managed, royalty free, or a variant thereof, such as the rights simple price model that will be discussed with reference to FIG. 10.

Figure 8:
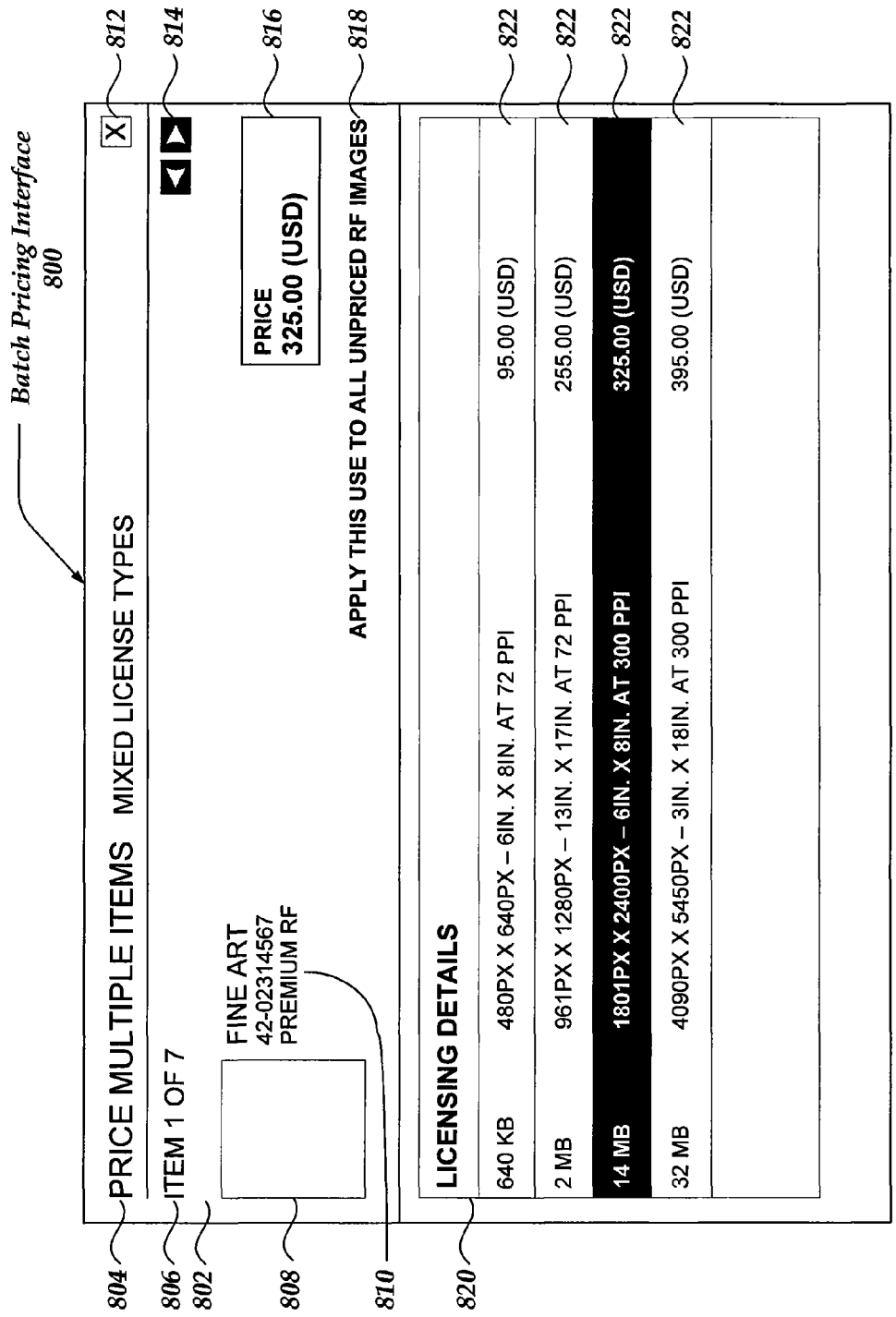
FIG. 8 is one embodiment of a user interface for batch pricing digital images in which a first image to be priced is a royalty free (RF) image.
Figure 9:
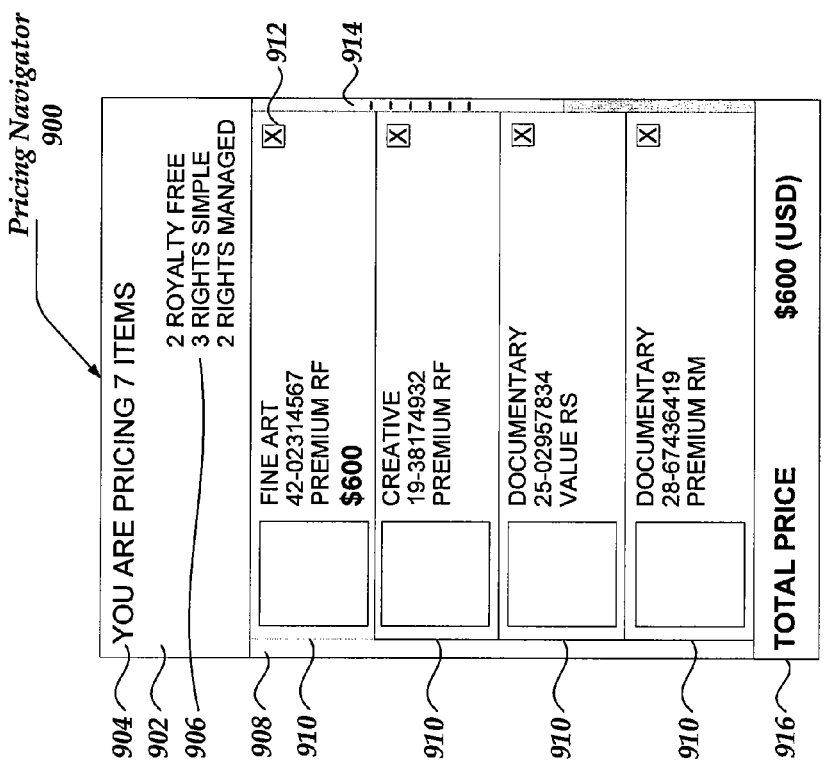
FIG. 9 is one embodiment of a user interface for a pricing navigator used to control the process of batch pricing digital media items.
Figure 10:
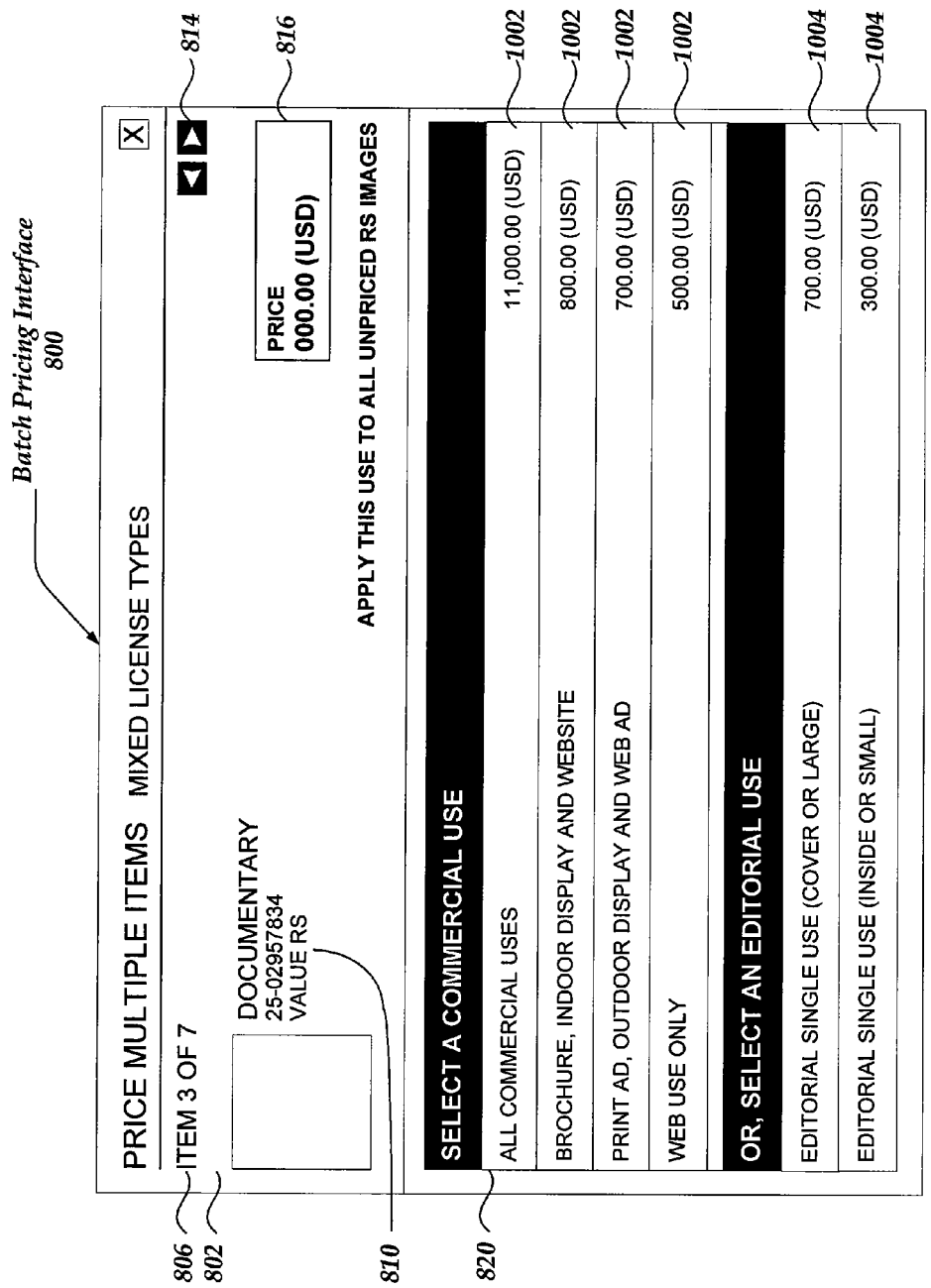
FIG. 10 is one embodiment of a user interface for batch pricing digital images in which a third image to be priced is a rights simple image.
Figure 11:
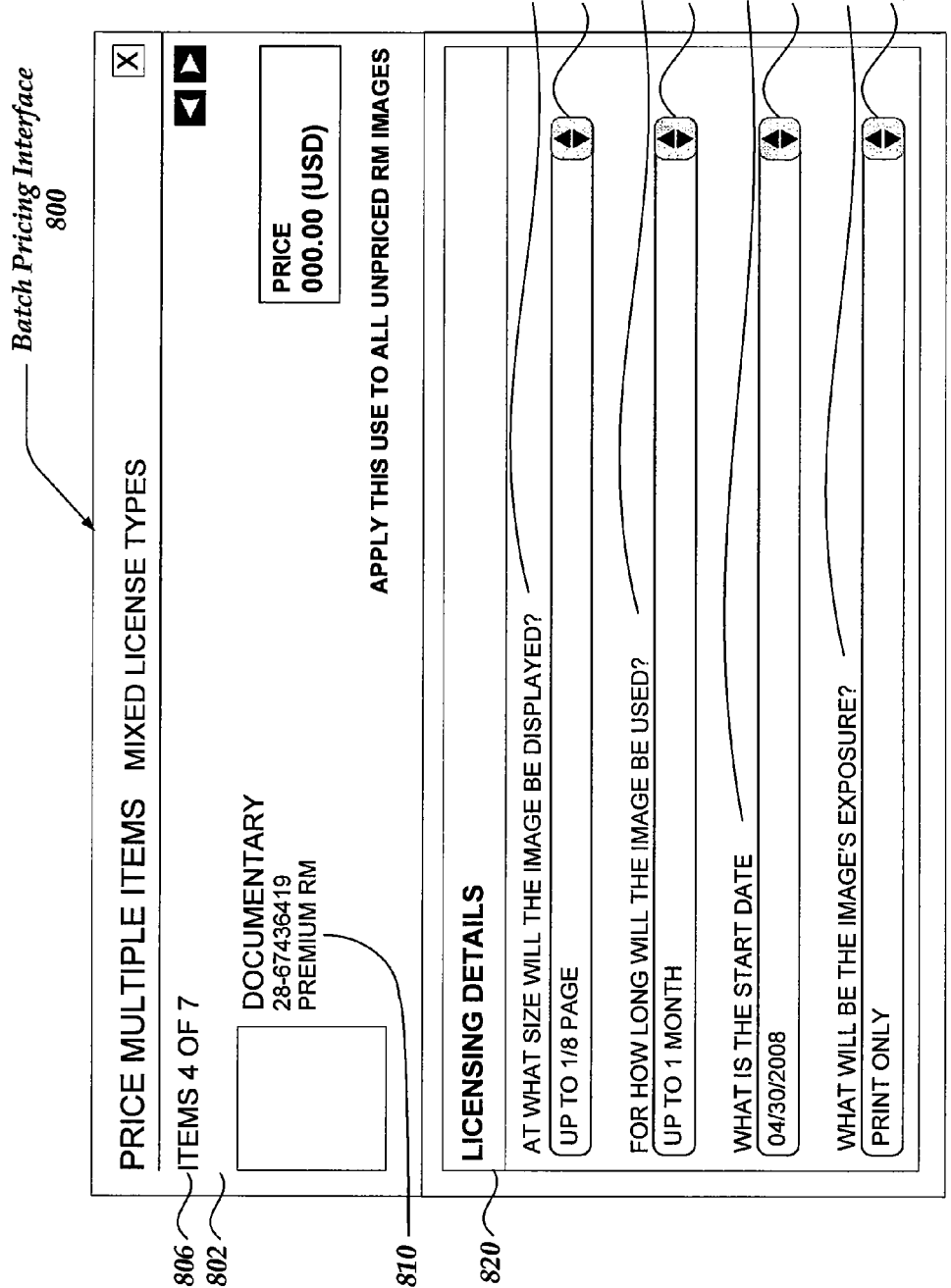
FIG. 11 is one embodiment of a user interface for batch pricing digital images in which a fourth image to be priced is a rights managed image.
Figure 12:
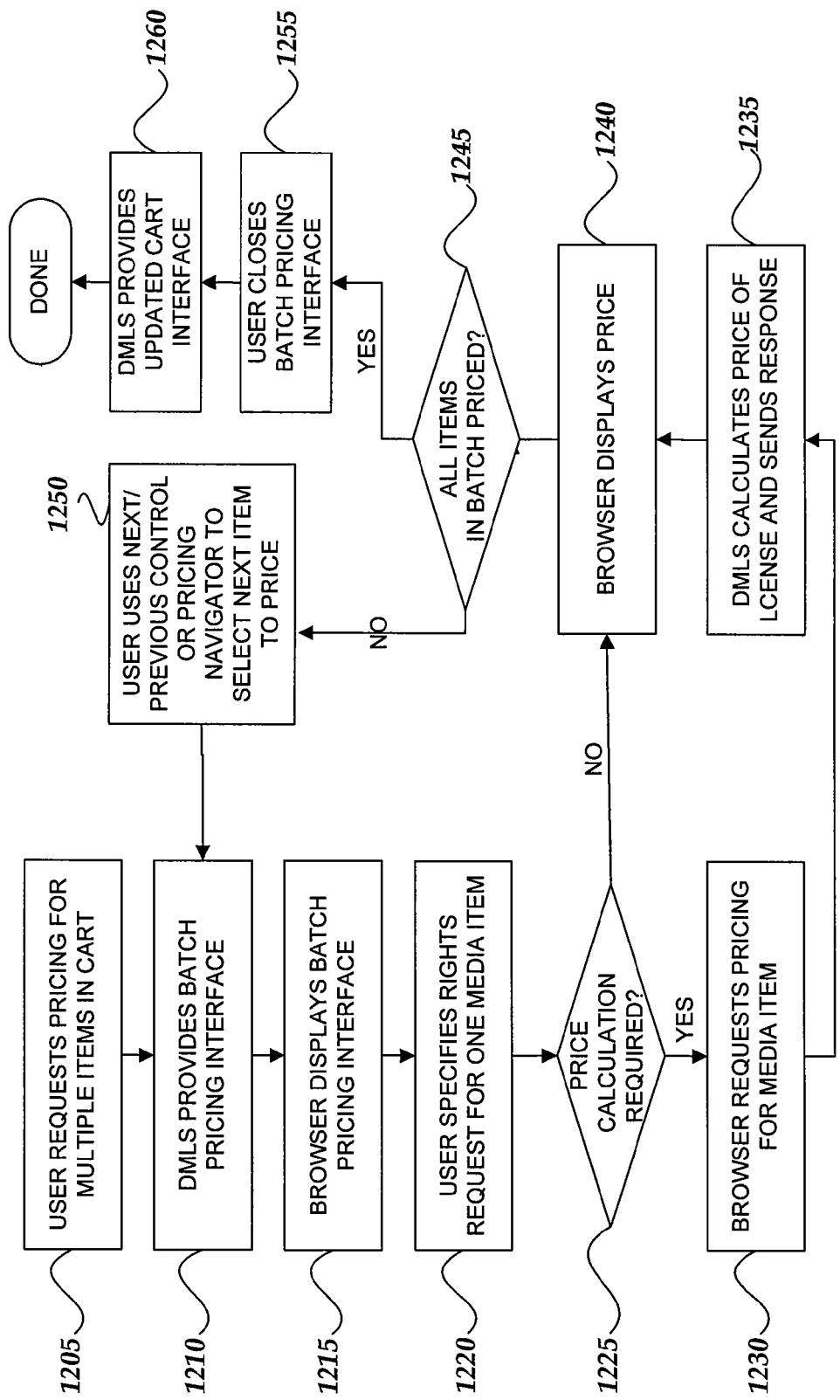
FIG. 12 is a logical flow diagram generally showing a process for selecting and pricing multiple media items using a batch pricing user interface.

FIGS. 8-12 describe embodiments of a general user interface for batch pricing multiple digital media items. The batch pricing interface enables a user to select multiple media items as a batch of media items, irrespective of their licensing or pricing model, and then price them in one automated batch process, using a unified user interface. In one embodiment, the user interface has three functional areas: an information area, a selection area, and a pricing navigator. The behavior of the information area and the navigator are independent of the number of media items to be priced and their respective price models. The selection area, which enables the user to interactively request rights, is customized for each licensing or price model. FIG. 8 provides an embodiment of the batch pricing interface in which a royalty free (RF) digital image is being priced. FIG. 9 provides an embodiment of a pricing navigator for controlling the process of pricing multiple digital images. FIG. 10 provides an embodiment of the batch pricing interface in which a rights simple (RS) digital image is being priced. FIG. 11 provides an embodiment of the batch pricing interface in which a rights managed (RM) digital image is being priced. While FIGS. 8, 10 and 11 are specific to the licensing of digital images, comparable user interfaces may be used for licensing of other media types such as digital video, digital music and the like.

FIG. 8 illustrates one embodiment of a user interface for batch pricing digital images in which a first image to be priced is a royalty free (RF) image based on a batch processing. Batch pricing interface 800 includes an information area 802 that is substantially the same regardless of the price model or media type being priced, and a rights request area 820 in which the user requests rights for the image. Information area includes a summary message 804 that indicates whether images of one price model are being batch priced or if mixed license types are being priced, an item number indicator 806 that indicates which item is currently being priced, an image thumbnail 808 that visually depicts the image to be licensed, metadata 810, a next/previous item control 814, a price indicator 816 and an apply this use control 818. Metadata 810 includes a name of the collection or subcollection to which the image belongs, "FINE ART", in the example, the Unique ID for the image, and the name of the price model, "PREMIUM RF" in the example. Next/previous item control 814 enables the user to move to the next image, unless the final image is being displayed or the previous image, unless the first image is being displayed.

Batch pricing interface 800 appears when a user attempts to move multiple cart items 708 from unpriced items window 720 to priced items window 716, or when the user selects price now control 724 to price multiple media items in price items window 722. In one embodiment, batch pricing interface 800 appears when a user selects multiple media items using modeless search interface 500 and then selects the get price media item control 522 to price the selected media items. When batch pricing interface 800 first appears, rights request area 820 is customized for the price model of the first media item in the batch of media items selected, also referred to simply as the "batch." For example, in FIG. 8, rights request area 820 is customized for royalty free pricing, in FIG. 10, rights request area 820 is customized for rights simple pricing and in FIG. 11, rights request area 820 is customized for rights managed pricing.

In the example shown in FIG. 8, the specific price model being applied is named "PREMIUM RF" which is a type of royalty free pricing where the price of a license depends on the size of the image to be licensed. A number of image size options 822 are presented, each with a different price. In the example, the user has selected the 14 megabyte (MB) image size option. When the user selects one of image size options 822, browser 404 displays the corresponding price, 325 USD in this example, in price indicator 816. Once the user has specified the rights requested for a media item, in this case by selecting an image size, apply this use control 818 becomes active. If the user selects apply this use control 818 then the rights requests made in rights request area 820 are applied to all other media items selected for batch pricing with the same price model. In many cases, the functionality provided by apply this use control 818 will considerably simplify for the user the process of pricing multiple media items by reducing the number of steps in the process.

Using next/previous item control 814 the user successively prices each of the media items in the batch. The user can exit batch pricing interface 800 at any time using a close control 812. If the user has priced all media items in the batch then the corresponding cart items 708 will appear in priced items window 716. If the user attempts to close batch pricing interface 800 prior to pricing each of the media items in the batch then, in one embodiment, a warning message appears alerting the user that not all items have been priced. In this case, the user is given the option of pricing the remaining items or closing batch pricing interface 800 without saving any of the prices. In another embodiment, if the user attempts to close batch pricing interface 800 prior to pricing each of the media items in the batch then only those items in the batch that have been priced are added to priced items window 716.

FIG. 9 is one embodiment of a user interface for a pricing navigator used to control the process of batch pricing digital media items. Pricing navigator 900 displays a list of media items to price and enables a user to select and price media items individually, in or out of the displayed sequence. Pricing navigator 900 further enables a user to view the cumulative price for licensing the media items in the list that have been priced. In addition, pricing navigator 900 enables a user to delete individual media items from the list. Further, pricing navigator 900 may be used to reprice selected media items, for example, after the user modifies the rights requested for the media item in rights request area 820.

Pricing navigator 900 appears and may be used in conjunction with batch pricing interface 800. In one embodiment, pricing navigator 900 appears in a separate window or pane to the right of or to the left of batch pricing interface 800 on the display of at least one of client devices 101-104 of FIG. 1. In another embodiment, it may be detached by the user and placed anywhere on the display. In one embodiment, pricing navigator 900 can be closed by the user and reopened at any time. In another embodiment, pricing navigator 900 is an optional control element and the user may specify that it should not appear at all.

Pricing navigator 900 includes a status area 902, a control area 908 and a total price indicator 916. A status message 904 indicates the number of media items in the batch. A price model status message 906 lists each different price model that the media items in the batch belong to and the number of media items in the batch that belong to each of the listed price models.

Control area 908 includes a navigator item 910 for each media item in the batch. Navigator item 910 includes an image thumbnail and descriptive metadata for one media item. The navigator item 910 that corresponds to the media item currently being priced using batch pricing interface 800 is visually indicated, typically using a colored or tonal background. In one embodiment, the user can select a different media item to price by selecting the corresponding navigator item 910. In one embodiment, when the user selects a different media item to price pricing navigator 900 displays a message informing the user that the pricing operation is not complete for the current item being priced and asking if the user really wants to terminate the operation.

When a media item is priced using batch pricing interface 800 the price appears in the descriptive metadata for the corresponding navigator item 910. If an error occurs when pricing a media item, then navigator item 910 displays a status message and a link that the user may click to resolve the error. The status message is typically one of messages listed in Table 5. In addition, navigator item 910 includes a close control 912. If the user selects close control 912 then the corresponding media item is deleted from the batch and the batch price control 910 for the media item disappears.

FIG. 10 is one embodiment of a user interface for batch pricing digital images in which a third image to be priced is a rights simple image. In this example, rights request area 820 is customized to enable the user to specify rights available from the rights simple licensing model. In the example, item number indicator 806 indicates that item number 3 of 7 is being priced. Metadata 810 shows that the item belongs to a documentary collection or subcollection and to the "VALUE RS" price model. Both the forward and backward directions of next/previous item control 814 are enabled. Price indicator 816 is set to zero indicating that the item hasn't yet been priced.

The rights simple licensing model applied to the image being priced in example illustrated in FIG. 10 is a hybrid between royalty free and rights managed in that the image is licensed for a specified use, in this example, either commercial or editorial. However, the price model applied to the rights simple is similar to that of royalty free in that the priced is determined by a single selection. Thus, the user may select one of a number of commercial uses 1002 or alternatively may select one of a number of editorial uses 1004.

FIG. 11 is one embodiment of a user interface for batch pricing digital images in which a fourth image to be priced is a rights managed image. In this example, rights request area 820 is customized to enable the user to specify rights available from the rights managed licensing model. In the example, item number indicator 806 indicates that item number 4 of 7 is being priced. Metadata 810 shows that the item belongs to a documentary collection or subcollection and to the "PREMIUM RM" price model. Price indicator 816 is set to zero indicating that the item hasn't yet been priced.

In the example shown in FIG. 11, the specific price model is named "Premium RM" which is a rights managed price model where the pricing level is somewhat higher than for other, nonpremium, rights managed images. To obtain a price, the user might answer a series of multiple choice usage questions 1102 using a pull-down menu 1104 that appears below the corresponding question. The invention is not limited to pull-down menus, and other mechanisms may also be employed. For example, in other embodiments, the user might fill in responses within a form field, select from radio dials, or the like. In any event, when user has made the selections, browser 404 sends a pricing request, containing the user's responses to multiple choice usage questions 1102 together with the Unique ID of the image, to DMLS 420. DMLS 420 uses price calculator 428 to obtain a price and then sends the price back to browser 404 in a response message.

FIGS. 8, 10 and 11 present embodiments of batch pricing interface 800 where the rights request area 820 of batch pricing interface 800 is customized for different price models for digital media, namely royalty free (RF), rights simple (RS) and rights managed (RM). It may be appreciated by one skilled in the art that these three embodiments enable a user to perform the common functions of obtaining a price in a nearly identical manner. While each different price models may result in different customization of rights request area 820, in all other regards the three embodiments are virtually identical. Further, it may be appreciated that the user does not have to have any pre-existing knowledge of the different price models to use the user interfaces presented in FIGS. 8-11. The user simply makes one or more selections based on their intended usage of the media item. Thus, a wide variety of different price models can be implemented in the spirit of the example user interfaces illustrated in FIGS. 8-11.

It should be noted above, that the interfaces illustrated in FIGS. 5-11, may include more or less components than those shown in the figures. However, the components shown are sufficient to disclose an illustrative embodiment for practicing the present invention.

FIG. 12 is a logical flow diagram generally showing one embodiment of a process of selecting and pricing multiple media items using a batch pricing user interface. It may be appreciated by one skilled in the art that the user interfaces depicted in FIGS. 5-11 enable the user to perform actions in various sequences; e.g., no particular sequential or guided set of actions is enforced. Therefore, the sequence of steps presented in FIG. 12 represent one of many possible sequences that can be used to obtain pricing using a batch pricing interface such as batch pricing interface 800.

The method begins at step 1205 when a user requests pricing for multiple cart items 708. This may be accomplished by dragging one or more items from items to checkout window 704, priced items window 716, or unpriced items window 720 to price items window 722 and then selecting price now control 724. This enables the user to price previously unpriced cart items 708 or reprice previously priced cart items 708. In response to the user selecting price now control 724, browser 404 sends a request for pricing message that includes the Unique ID for each cart item 708 in price items window 708.

At step 1210, DMLS 420 responds to the request for pricing message by sending batch pricing interface 800 and pricing navigator 900 to browser 404 for display to the user. Rights request area 820 is customized for the price model that corresponds to the first cart item 708 in the list of cart items 708 sent by browser 404 in the abovementioned pricing request message. Further the order of navigator items 910 corresponds to the order of cart items 708 within price items window 722. Consequently, at step 1215, browser 404 displays batch pricing interface 800 and pricing navigator 900 to the user.

At step 1220, the user specifies the rights to be licensed using the interactive user interface provided in rights request area 820.

At step 1225, a determination is made as to whether a price calculation is to be performed. Typically, if the user makes a single selection to specify their rights request as in the examples provided in FIGS. 8 and 10, the price corresponding to each possible user selection is displayed in selection area 820. In this case, since browser 404 already has the price and no further calculation is required processing continues at step 1240. Typically, if the user must make more than one selection to specify their rights request, as in the example provided in FIG. 11, a price calculation is to be performed, processing continues at step 1230.

At step 1230 browser 404 sends a price calculation request to DMLS 420. The request includes the Unique ID of the media item being priced and a description of the rights requested by the user.

At step 1235 DMLS 420 uses price calculator 428 to compute the price for licensing the media item for the rights requested by the user. DMLS 420 then sends a response to the price calculation request that includes the requested price.

At step 1240 browser 404 displays the license price in price indicator 816 for the rights requested by the user.

At step 1245 a determination is made as to whether all items in the batch have been priced. It may be appreciated that some of the items in the batch may have been priced for the first time and some may have been repriced. Typically, the user may sequentially price each of the items in the batch. When the final item is reached, the next control (right arrow) in next/previous control 814 may dim, in one embodiment, indicating that the last item is currently displayed. If there are more items to price, or the user wishes to reprice an item, then processing continues at step 1250. If all items in the batch have been priced and the user is ready to terminate batch pricing then processing continues at step 1255.

At step 1250 the user uses next/previous control 814 or pricing navigator 900 to select a new item to price. Then processing continues at step 1210.

At step 1255 the user selects close control 812 to indicate to browser 404 that he/she has finished with batch pricing. In one embodiment, if all items in the batch have been priced then browser 404 displays a message asking the user if they have finished with batch pricing. Selecting yes from this message has the same effect as selecting close control 812.

At step 1260, browser 404 requests that DMLS 420 provide an updated cart interface 700 and DMLS responds by providing an updated cart interface 700. Items that were successfully priced using batch price interface 800 now appear in priced items window 716.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems that perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed is:

1. A network device, comprising:
   a storage device useable to store at least a purchase data base and a license data base;
   a processor; and
   a non-transitory memory storing computer executable instructions that when executed by the processor cause the processor to perform steps: comprising:

providing, to a client device, an electronic cart interface operable to select a batch of digital media items, each digital media item having a status of priced or unpriced;

receiving, from the client device, a batch of selected digital media items, each digital media item in the batch having a status of unpriced;

providing, to the client device, a pricing interface operable to select one or more rights;

receiving, from the client device, a selection of one or more rights;

for each digital media item in the batch, calculating a price based on a pricing model corresponding to the digital media item and the received selection of one or more rights;

for each digital media item in the batch, determining whether the digital media item is available for licensing according to the received selection of one or more rights; and displaying an aggregation of the prices calculated for each digital media item in the batch for which the digital media item is determined by said determining to be available for licensing.

2. The network device of claim 1 wherein said instructions cause the processor to perform steps further comprising providing a pricing navigator interface to the client device operable to:

display a list of the plurality of digital media items selected for pricing; and select one of the plurality of digital media items to be priced.

3. The network device of claim 2 wherein said pricing navigator is further operable to:

accumulate a license price of the digital media items selected for pricing wherein at least one of the selected media items has a status of unpriced; and display the accumulated license price.

4. The network device of claim 1, wherein providing a pricing interface further comprises:

customizing the pricing interface based on a pricing model associated with a first digital media item in the batch of digital media items.

5. A non-transitory processor readable storage medium that includes data and instructions, wherein the execution of the instructions by a processor cause the processor to perform steps, comprising:

receiving, from a client device, a selection of a batch of media items, wherein at least one media item within the batch of media items is associated with a different pricing model than at least one other media item within the batch of media items;

providing, to the client device, a pricing interface operable to select one or more rights;

receiving, from the client device, a selection of one or more rights;

for each media item in the batch, calculating a price based on a pricing model corresponding to the media item and the received selection of one or more rights;

for each digital media item in the batch, determining whether the digital media item is available for licensing according to the received selection of one or more rights; and displaying, at the client device, an aggregation of the prices calculated for each media item in the batch for which the digital media item is determined by said determining to be available for licensing.

6. The processor readable storage medium of claim 5, wherein providing the pricing interface further comprises:

customizing the pricing interface based on a pricing model associated with a first media item within the batch of media items selected for pricing.

7. A system for enabling a communications over a network, comprising:

a storage device having stored thereon at least a purchase database comprising records of electronic carts, each record including at least a status designation of each media item in the electronic cart; and a network device in communication with the storage device that is configured to perform actions, including:

receiving, from a client device, a selection of a batch of media items from the purchase database;

providing, to the client device, a pricing interface operable to select one or more rights;

receiving, from the client device, a selection of one or more rights;

for each media item in the batch, calculating a price based on a pricing model corresponding to the media item and the received selection of one or more rights;

for each digital media item in the batch, determining whether the digital media item is available for licensing according to the received selection of one or more rights; and providing to the client device an aggregation of the prices calculated for each media item in the batch for which the digital media item is determined by said determining to be available for licensing.

8. The system of claim 7, wherein providing a pricing interface further comprises:

customizing the pricing interface based on a pricing model associated with a first selected media item within the batch of media items.

9. The system of claim 7, wherein the pricing interface is further operable to:

accumulate a license price of the digital media items selected for pricing wherein at least one of the selected media items has a status of unpriced; and display said accumulated license price.

10. The system of claim 7, wherein the pricing interface is customized based on a pricing model for each media item in the batch of media items, and wherein at least one of the customized pricing interfaces employs at least one of a form field or radio dial interface for providing an answer to at least one question used in determining a licensing right.

11. The system of claim 7, wherein receiving, from a client device, a selection of a batch of media items, further comprises receiving an indication that the batch of media items displayed by the client device are dragged from a first display region to a second display region.

* * * * *